(12) United States Patent
Suh et al.

(10) Patent No.: US 9,070,083 B2
(45) Date of Patent: Jun. 30, 2015

(54) METHOD FOR LEARNING TASK SKILL AND ROBOT USING THEREOF

(75) Inventors: Il-Hong Suh, Seoul (KR); Sang-Hyoung Lee, Seoul (KR); Jae Pyung Hwang, Seoul (KR)

(73) Assignee: IUCF-HYU Industry-University Cooperation Foundation Hanyang University, Seoul (KR)

( * ) Notice: Subject to any disclaimer, the term of this patent is extended or adjusted under 35 U.S.C. 154(b) by 165 days.

(21) Appl. No.: 13/535,455

(22) Filed: Jun. 28, 2012

(65) Prior Publication Data

US 2013/0151442 A1 Jun. 13, 2013

(30) Foreign Application Priority Data

Dec. 13, 2011 (KR) .................. 10-2011-0133798
Feb. 24, 2012 (KR) .................. 10-2012-0018856

(51) Int. Cl.
*G06F 15/18* (2006.01)
*G06N 3/00* (2006.01)

(52) U.S. Cl.
CPC ........................... *G06N 3/008* (2013.01)

(58) Field of Classification Search
None
See application file for complete search history.

(56) References Cited

U.S. PATENT DOCUMENTS

| | | | | |
|---|---|---|---|---|
| 2005/0240544 | A1* | 10/2005 | Kil et al. | 706/45 |
| 2005/0286767 | A1* | 12/2005 | Hager et al. | 382/190 |
| 2007/0103471 | A1* | 5/2007 | Yang et al. | 345/473 |
| 2009/0287624 | A1* | 11/2009 | Rouat et al. | 706/20 |
| 2013/0117212 | A1* | 5/2013 | Hunzinger et al. | 706/25 |

OTHER PUBLICATIONS

Bentivegna, D. et al., *Learning From Observations Using Primitives*, 2001 IEEE International Conference on Robotics and Automation (ICRA), vol. 2 (2001) 1988-1993.
Nicolescu, M. et al., *Natural Methods for Robot Task Learning: Instructive Demonstrations, Generalization and Practice*, Proceedings of the Second International Joint Conference on Autonomous Agents and Multiagent Systems (2003) 241-248.

* cited by examiner

*Primary Examiner* — Alan Chen
(74) *Attorney, Agent, or Firm* — Alston & Bird LLP

(57) ABSTRACT

Provided are a method for learning task skill and a robot using the same. The modeling method for learning a task skill includes: receiving training data for a task to be performed by a learning engine; dividing, by the learning engine, the received training data into segments by using a geometric property of a predetermined probabilistic model; and learning, by the learning engine, a basis skill for the divided segments by modeling each divided segment.

13 Claims, 19 Drawing Sheets

Classified basis skill

New HMM (a) Classified basis skill

710

(b) Classified basis skill

720

METHOD FOR LEARNING TASK SKILL AND ROBOT USING THEREOF

CROSS-REFERENCE TO RELATED APPLICATIONS

This application claims priority under 35 U.S.C. §119 to Korean Patent Application Nos. 10-2011-0133798 and 10-2012-0018856, filed on Dec. 13, 2011 and Feb. 24, 2012, respectively, in the Korean Intellectual Property Office, the disclosure of which is incorporated herein by reference in its entirety.

TECHNICAL FIELD

The following disclosure relates to a method for learning a task skill, and in particular, to a method for learning a task skill, in which the task skill of a human being is taught to an artifact such as an intelligent robot and expanded so that the artifact may solely perform a corresponding work under a given environment, a recording medium where the method is recorded, and a robot using the method.

BACKGROUND

An intelligent robot (or, an agent) obtains training data, required for performing a task, through interaction with a human being. A single model may be generated by using the training data obtained by the robot, or segmented models may be generated by using data divided in advance based on human beings or prior knowledge. The generated model is used in regeneration required for the robot to perform a task. The method for obtaining basis skills from the training data about works has been discussed in the non-patent document listed below.

However, in a case where a task is expressed as a single model when generating a model for performing tasks by using the training data, it is not easy to reuse the model. This is because, when it is intended to correct information of the single model or add information to the single model, the entire model should be generated again. Therefore, generating segmented models is more useful for reusing the corresponding model.

In conventional task-performing model generating methods for generating segmented models, training data is segmented based on human beings or prior knowledge, and models are generated based on the training data. However, in case of using human beings or prior knowledge to generate segmented models, the models are generated in various ways depending on individual preferences or prior knowledge, and thus so many sorts of outputs are obtained.

In addition, the model needs to be improved by gradual learning. In the conventional case, a person selects a model to be improved and generates data for improvement continuously and gradually so that the data is used for improving the model. However, the conventional gradual learning methods are just considering a correction of an existing model, without considering an addition of new information while maintaining an existing model.

A model for performing a task of a robot should be capable of being continuously and gradually added and corrected, and a task should be capable of being regenerated based thereon. For this, schemes for performing a task recognition technique and a task regeneration technique simultaneously should be provided so that a robot may perform the task, but the conventional techniques have separately generated and used a model for regenerating a task of a robot and a model for recognizing a task.

However, an intelligent robot should be capable of generating a model for performing a given task under an uncertain environment and regenerating a task based thereon. In addition, the generated model should be easily reused, and information may be corrected or added by using the gradual learning method.

It is highly possible that the environment where a given task should be performed based on a model learned by such an intelligent robot does not perfectly coincide with the learning model. In particular, the chance that the environment perfectly identical to that defined by the model learned in a general working environment or field utilizing an intelligent robot is provide to an intelligent robot is very low. Generally, an intelligent life such as a human being and animal has an ability of flexibly performing a given task based on the already learned knowledge in spite of such a slightly changed environment, and such an application or changing ability is required to an intelligent robot in aspect of technique and tool utilization. In other words, the intelligent robot should also generate a model required for performing a given task under an uncertain environment, and change the model suitably to perform the corresponding task. In particular, even under a situation where the given task changes in real time, the robot should adaptively solve the corresponding task while changing the information based on the learned model.

RELATED DOCUMENT

Non-Patent Document (Non-patent document 1) D. Bentivegna and C. Atkeson, "Learning from observation using primitives," in 2001 IEEE International Conference on Robotics and Automation (ICRA), vol. 2, 2001, pp. 1988-1993.

(Non-patent document 2) M. Nicolescu and M. Mataric, "Natural methods for robot task learning: Instructive demonstrations, generalization and practice," in Proceedings of the second international joint conference on Autonomous agents and multiagent systems, 2003, pp. 241-248.

SUMMARY

Since a conventional task skill learning method uses a single model, an intelligent robot is not able to perform modified or expanded works, other than an initially given task, or has limitations in reusing a learned model for performing the works. In addition, despite that the learned basis skill needs to be gradually improved, the learned skill should be entirely corrected since the intelligent robot has learned based on the single model. The present disclosure is directed to solving such inconvenience.

When an intelligent robot learns a skill, a general robot has a limit in that it may express and regenerate only a skill conforming to a given task as a model. An embodiment of the present disclosure is directed to solving the inconvenience that a task may not be accurately performed even though the work environment or condition changes just a little, and also directed to solving the problem that the robot may not suitably cope with a changing task since the path for the task skill is statically fixed under an environment where the task is changing in real time.

In order to solve the technical object, the present disclosure provides a modeling method for learning a task skill, which is performed by a learning engine having at least one processor, the modeling including: receiving training data for a task to be performed by the learning engine; dividing, by the learning engine, the received training data into segments by using a geometric property of a predetermined probabilistic model; and learning, by the learning engine, a basis skill for the divided segments by modeling each divided segment.

According to an embodiment, the dividing of the received training data into segments may include: determining a segmentation point by analyzing geometric properties of a Gaussian mixture model (GMM) and a Gaussian mixture regression (GMR) for the received training data; and dividing the training data into segments based on the determined segmentation point. In addition, the determining of a segmentation point may include: converting the segmentation point into a dimension, which ensures easy extraction, by reducing the number of dimensions of the training data by means of a principal component analysis (PCA); generating a Gaussian mixture model by using the converted training data and extracting a window, which is a region where mixture components of the generated Gaussian mixture model overlap each other in time, as a candidate region of a segmentation point; and selecting a point, where the covariance calculated by the Gaussian mixture regression has a minimal value in the extracted candidate region, as the segmentation point.

According to an embodiment, the modeling method for learning a task skill may further include: receiving new training data for a task to be performed by the learning engine; generating, by the learning engine, a classifier having a threshold model for classifying the basis skill and the new training data into segments; and modeling, by the learning engine, a task skill of multi paths expanded from the basis skill by combining the learned basis skills with the new training data classified into segments by using the generated classifier.

In another general aspect, there is provided a method for learning a task skill includes: receiving training data for a predetermined task through kinesthetic teaching by a learning engine having at least one processor; encoding, by the learning engine, the input training data by using a Gaussian mixture model (GMM) to model the training data into probability information geometrically analyzed; and generating, by the learning engine, a modified task skill for the predetermined task by combining the modeled probability information with a transformation matrix.

According to an embodiment, the generating of a modified task skill may include: setting a transformation matrix to change at least one of scaling, rotation and movement for the predetermined task; and generating a modified task skill by changing mean and variance of a mixture component, which are geometric information of the modeled probability information, by using the set transformation matrix.

According to an embodiment, the method for learning a task skill may further include generating, by the learning engine, a path for the predetermined task by generalizing the modified task skill by using a Gaussian mixture regression (GMR). In addition, the method for learning a task skill may further include: in a case where the predetermined task changes in real time, adaptively regenerating, by the learning engine, a path for the task skill from the path generated through the GMR in consideration of changed target location and stiffness.

In another general aspect, there is also provided a computer-readable medium on which program for executing the above method for learning a task skill is recorded.

According to the embodiments of the present disclosure, since a basis skill is learned by generating a model from segmented training data for performing a task by using task performing information obtained by a robot without any help of other persons or prior knowledge, a learning model for performing not only an originally given task but also modified or expanded tasks may be easily obtained and reused. In addition, since a new task is recognized based on the learned basis skill and an expanded model is generated to solve the new task, a new basis skill may be flexibly expanded and continuously added.

In the embodiments of the present disclosure, the probability information modeled to perform a given task is combined with a transformation matrix, and so it is possible to learn a skill conforming to the given task and a task skill with a modified form. Therefore, even though a work environment or condition changes a little, the corresponding task may be performed through the modified task skill. Further, under an environment where a task is changing in real time, the changing task may be suitably handled by adaptively regenerating a path of the modified task skill through GMR.

BRIEF DESCRIPTION OF THE DRAWINGS

The above and other objects, features and advantages of the present invention will become apparent from the following description of certain exemplary embodiments given in conjunction with the accompanying drawings, in which.

DETAILED DESCRIPTION OF EMBODIMENTS

Figure 1:
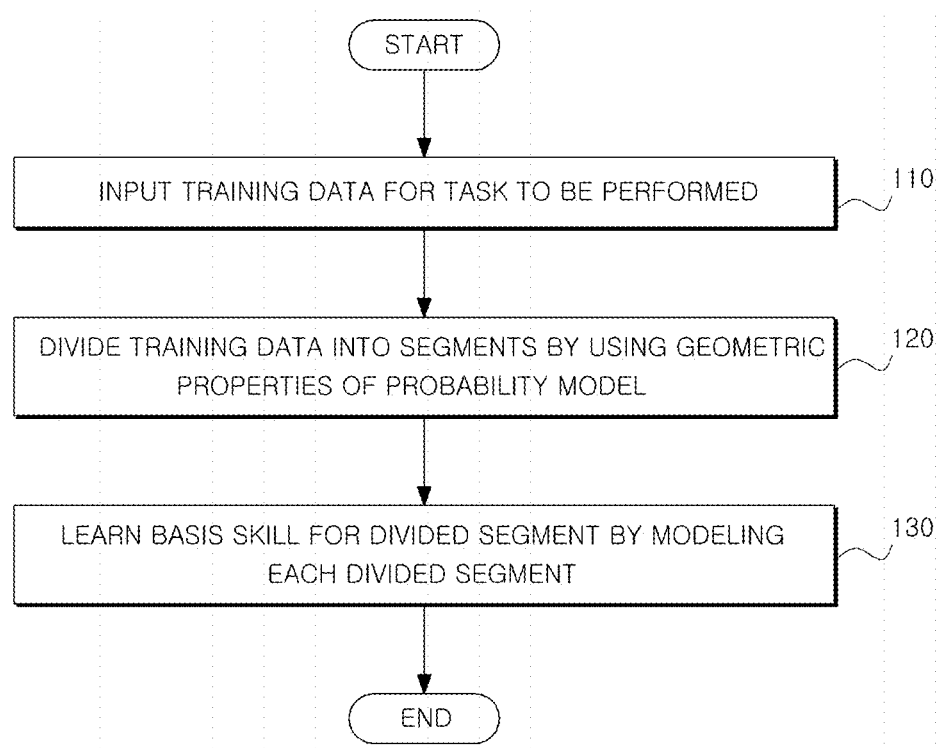
FIG. 1 is a flowchart for illustrating a modeling method for learning a task skill performed by a learning engine according to an embodiment of the present disclosure.

Prior to describing embodiments of the present disclosure, the environment where the embodiments of the present disclosure will be introduced in brief, and the problems of the environment where the embodiments are implemented will be proposed.

A task may be defined as a series of meaningful actions, and an intelligent robot should be capable of learning meaningful actions, which are called as basis skills, from training data for the task. For this, a robot which may be utilized under an environment for implementing embodiments of the present disclosure is assumed. This robot will have a driving means such as a robot arm controlled by at least one microprocessor, and the robot may be combined with various kinds of mechanical driving means as apparent to those having ordinary skill in the art. Therefore, in the following embodiments of the present disclosure, the robot obtains training data while performing a given task by using a driving means such as a robot arm and learns basis skills therefrom.

As described above, the conventional techniques have proposed only a method of learning a task skill with a single model. In this case, two problems generally arise as follows.

First, since the task skill is learned with a single model, there is a limit in performing tasks other than the given task. In other words, it is difficult to perform a task in various ways by reusing skills. For example, in order to perform a "rice cooking" task, skills for scooping rice from a rice jar, moving the rice into a pot and placing the pot containing rice on the fire may be learned with a single model. In this case, when a task for performing "rice cooking" by spooning rice twice is performed using the above skills, a lot of unnecessary actions are included. Therefore, when a single model is used as in the conventional art, the same processes may repeat unnecessarily.

Second, in case of gradually improving task skills, since the task skills have been learned with a single model, even when some task skill does not need to be corrected, all skills should be corrected. For example, in a case where it is intended to correct only the action of spooning rice while performing the "rice cooking" task, there is no way to correct only the correction action.

Therefore, the following embodiments of the present disclosure propose a modeling method for learning skills by an intelligent robot, where basis skills are learned by using only eigen properties of training data of the given task without using prior knowledge or a predefined single model. For this, the embodiments of the present disclosure use an individual modeling method, which models training data by using probability methods, generates segmentation points by analyzing their geometric properties, and segments the training data based thereon.

In the embodiments of the present disclosure, the training data for a task should be segmented without depending on prior knowledge or predefined models. In addition, the training data should be meaningfully segmented according to the properties. The population of the training data may be expressed as a specific sub-population by using a Gaussian mixture model (GMM). Mixture components of the Gaussian mixture model provide important information about the meaningful segmentation of the training data. The modeling method described below suggests a method for segmenting training data based on geometric interpretation of the Gaussian mixture model and the Gaussian mixture regression (GMR). In addition, the following modeling method suggests gradual correction, addition of a basis skill and a classifier. Therefore, the basis skill is modeled as hidden Markov models (HMMs) by using the segmented training data. The classifiers include basis skills modeled by the hidden Markov model, and threshold models. The threshold model may be generated as an ergodic HMM by using a specific status of the basis skill.

FIG. 1 is a flowchart for illustrating a modeling method for learning a task skill performed by a learning engine according to an embodiment of the present disclosure, and the basis skill is modeled by dividing training data into segments which are a meaningful unit according to properties.

A series of processes described below may be performed by a learning engine having at least one processor. In the embodiments of the present disclosure, the process of learning a task skill may be performed by means of arithmetical calculation and software program, but in order to perform such a series of processes, there are also required a physical operator and a memory for loading and processing data necessary to perform the works. Therefore, the following processes may be performed by a learning engine having at least one hardware processor by means of a software processing procedure.

In Operation 110, the learning engine receives training data for a task to be performed. The training data may be input by a user at an initial stage by means of kinesthetic teaching or the like. The kinesthetic teaching means a process of notifying how to perform the corresponding task by using a mechanical driving means for initial learning of the learning engine. For example, a teacher may directly move a driving unit (which may be a robot arm) of an intelligent robot to demonstrate that the robot arm writes a letter, and the movement of the teacher is received as an input value so that the learning engine may recognize the corresponding input value (which may be a moving trajectory of the robot arm) as a task skill for writing a letter. In other words, the learning engine may receive training data by measuring each joint angle of the driving means based on the degree of freedom (DOF) endowed to a joint of the driving means.

In Operation 120, the learning engine divides the received training data into segments by using a geometric property of a probabilistic model. This process may be performed by calculating variance information of the received training data and determining a segmentation point, which is a criterion of segmentation, based on the calculated variance information. The segmenting method will be described in more detail later with reference to FIG. 2.

In Operation 130, the learning engine models each segment divided in Operation 120 and learns a basis skill for the divided segment. The process of learning a basis skill may be performed by generating a hidden Markov model (HMM) by using the segments divided in Operation 120.

Figure 2:
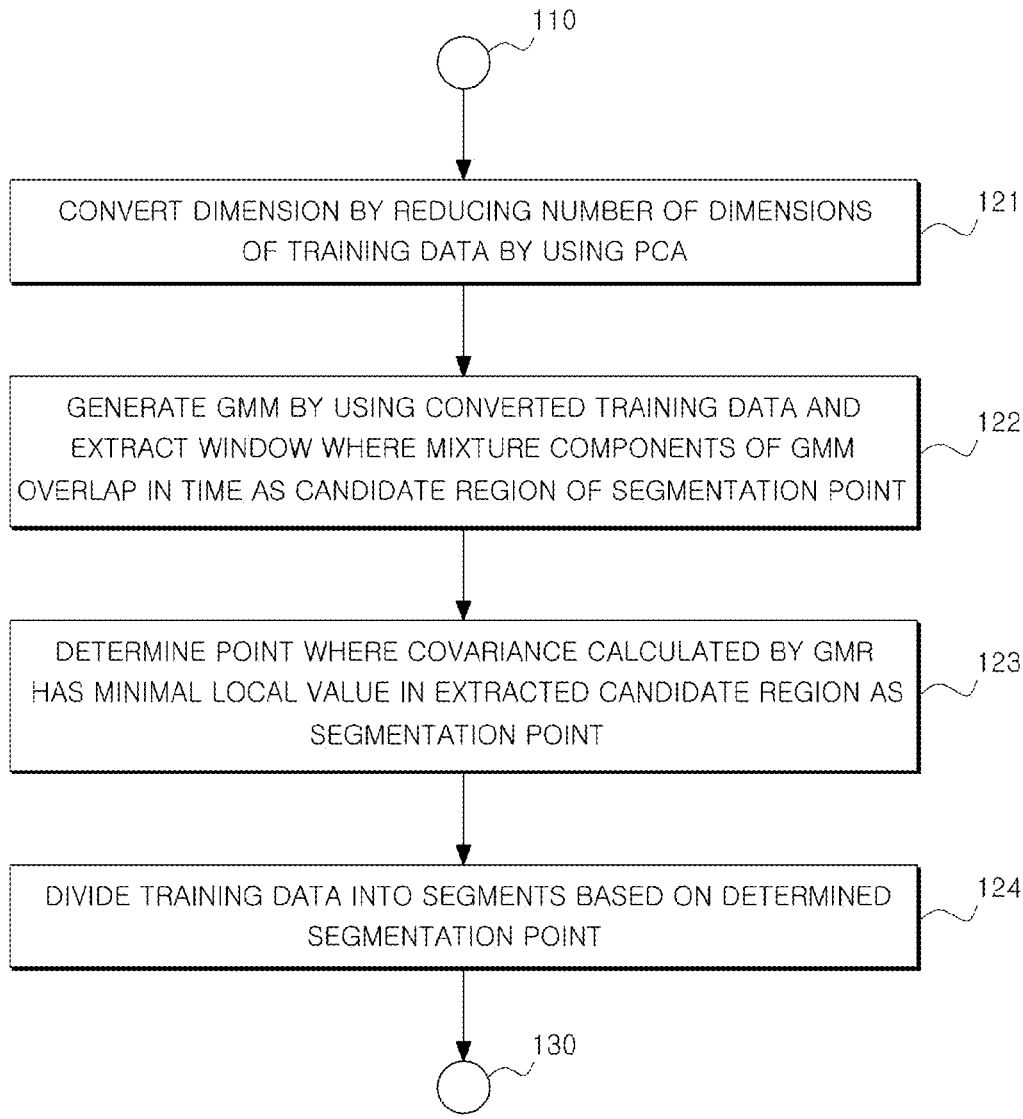
FIG. 2 is a flowchart for illustrating a method for dividing training data into segments in the method of FIG. 1 according to an embodiment of the present disclosure.

FIG. 2 is a flowchart for illustrating a method for dividing training data into segments in the method of FIG. 1 according to an embodiment of the present disclosure. A segmentation point is determined by analyzing geometric properties of the Gaussian mixture model (GMM) and the Gaussian mixture regression (GMR) for the received training data, and then the training data is divided into segments based on the determined segmentation point. Hereinafter, Operation 120 of FIG. 1 will be described in more detail, other than Operation 110 and Operation 130.

In Operation 121, the segmentation point is converted into a dimension, which allows easy extraction, by reducing the number of dimensions of the training data by means of the principal component analysis (PCA). As described above, the mixture components of the Gaussian mixture model provide important information for segmenting the training data. Training data of a single task is meaningfully segmented based on geometric interpretation of the Gaussian mixture model and the Gaussian mixture regression. For this, the principal component analysis reduces the number of dimensions of multivariate training data to express as having the most great amount of information, which may be usefully utilized for analyzing geometric information of the Gaussian mixture model and the Gaussian mixture regression. In the original space, the training data is converted as shown in Equation 1 below.

$$X - \bar{X} = A\Psi \quad \text{Equation 1}$$

Here, $\bar{X} \in \mathbb{R}(D+1) \times N$, $\bar{X} \in \mathbb{R}(D+1) \times N$, $A \in \mathbb{R}(D+1) \times (D'+1)$ and $\psi \in \mathbb{R}((D'+1) \times N)$ respectively represent training data in the original space, a mean of the training data in the original space, a transformation matrix of the principal component analysis, and training data in the converted space. Here, (D+1) represents D-dimensional space variable space variable and 1-dimensional time variable, D' represents a D'-dimensional space variable transformed by the principal component analysis, and N represents a size of the training data. The transformation matrix A is configured by using an eigenvector according to an eigen value of the covariance of the training data.

In Operation 122, a Gaussian mixture model (GMM) is generated by using the training data converted in Operation 121, and a window which is a region where mixture components of the Gaussian mixture model overlap each other in time is extracted as a candidate region of the segmentation point. The Gaussian mixture model is modeled using training data $\psi$ based on the Expectation-Maximization (EM) algorithm. The segmentation points are extracted by mixture components of the Gaussian mixture model. This is because mixture components express the population of training data by using several sub-populations. The segmentation point means a single time step for segmenting data. A teacher may adjust the number of segmentation points by changing the number of mixture components as desires. This may also be determined by means of minimal code length methods such as Bayesian information criterion (BIC) and Akaike information criterion (AIC).

The method of automatically determining the number of mixture components by using BIC is as follows. The function for a point of BIC is defined as in Equation 2 below.

$$S_{BIC} = -2 \cdot \log L + n_p \cdot \log(N) \quad \text{Equation 2}$$

Here, L represents likelihood, np represents the number of parameters of the model, and N represents the amount of training data. Here, np is defined as in Equation 3 below.

$$n_p = \left( \frac{K \cdot (D'+1)(D'+1)+1)}{2} \right) + (K-1) + (K \cdot (D'+1)) \quad \text{Equation 3}$$

Here, K represents the number of mixture components, and (D'+1) represents the number of variables.

The Gaussian mixture model is defined as in Equation 4 below.

$$P(X) = \sum_{i=1}^{K} w_i \cdot N(X \mid \mu_i, \Sigma_i) \quad \text{Equation 4}$$

Figure 3:
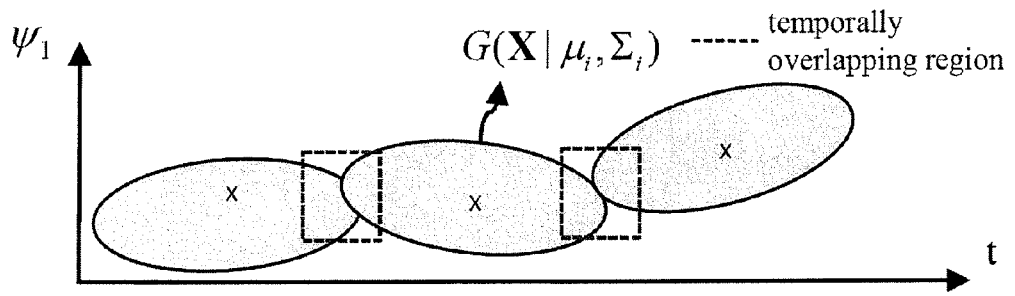
FIG. 3 is a diagram for illustrating a method for extracting a candidate region of a segmentation point in the modeling method for learning a task skill according to an embodiment of the present disclosure.

Here, wi, μi, and Σi represent an initial value of an $i^{th}$ mixture component, a mean, and a covariance. Each segmentation point should be extracted in a region where mixture components overlap each other as shown in FIG. 3. The regions where mixture components overlap are candidate regions for extracting segmentation points and are called windows. In order to generate the windows, Gaussian mixture components are geometrically interpreted based on inherent segmentation.

In Operation 123, a point where the covariance calculated by the Gaussian mixture regression (GMR) has a minimal local value in the candidate region extracted in Operation 122 is determined as the segmentation point. The covariance Σi of Equation 4 above is segmented as in Equation 5 below.

$$\Sigma_i = U_i \Lambda_i U_i^T \quad \text{Equation 5}$$

Here, Ui and Λi represent eigen values and eigenvectors of the $i^{th}$ mixture component. T represents transpose. The size of the mixture components is calculated by using a root of the eigen value Λi. This is because these values represent relative lengths of the eigenvectors. The upper boundary value of the window is defined as in Equation 6 below.

$$w_i^u = \mu_i^t + \sqrt{\Lambda_i^t} \quad \text{Equation 6}$$

Here, $\mu_i^t$ and $\sqrt{\Lambda_i^t}$ represent a mean of time variables at the $i^{th}$ mixture component and an eigen value for the time axis. In addition, the lower boundary value of the window is defined as in Equation 7 below.

$$w_i^l = \mu_{(i+1)}^t - \sqrt{\Lambda_{(i+1)}^t} \quad \text{Equation 7}$$

Here, $\mu_{(i+1)}^t$ and $\sqrt{\Lambda_{(i+1)}^t}$ represent a mean of time variables at the $(i+1)^{th}$ mixture component and an eigen value for the time axis. (K−1) windows are generated in the Gaussian mixture model having the K number of mixture components.

The segmentation points are extracted at a point where the covariance locally has a minimal value in the window. For this, regression is performed first by using a query of time variable. In order to calculate a local minimal value of the covariance, covariance of the Gaussian mixture regression are inherently segmented. This segmentation is defined as in Equation 8 below.

$$\Sigma_t = U_t \Lambda_t U_t^T \quad \text{Equation 8}$$

Here, Ut and Λt represents an eigenvector and an eigen value of the covariance at the time step t. Its relative length is calculated as in Equation 9 below.

$$r(t) = \frac{\|\sqrt{\Lambda_t}\|}{\sqrt{D'}}$$
Equation 9

Here, $\|\cdot\|$ represents a norm, and $\sqrt{D'}$ represents an element for standardizing the dimension of the covariance. The segmentation points are extracted as in Equation 10 below.

$S_i = \text{argmin}_t r(t), w_i^l < t < w_i^u$, for $\forall i=1,\ldots,(K-1)$   Equation 10

Therefore, (K−1) segmentation points are extracted from each of the (K−1) windows, one by one.

In Operation 124, the training data is divided into segments based on the segmentation point determined in Operation 123. Now, in order to model basis skills, the initial training data is segmented according to the (K−1) segmentation points. This segmentation is to gradually correct the basis skills and add a basis skill.

FIGS. 4a to 4f are diagrams for consecutively illustrating the process of generating a segmentation point for segmenting training data in the modeling method for learning a task skill according to an embodiment of the present disclosure.

Figure 4A:
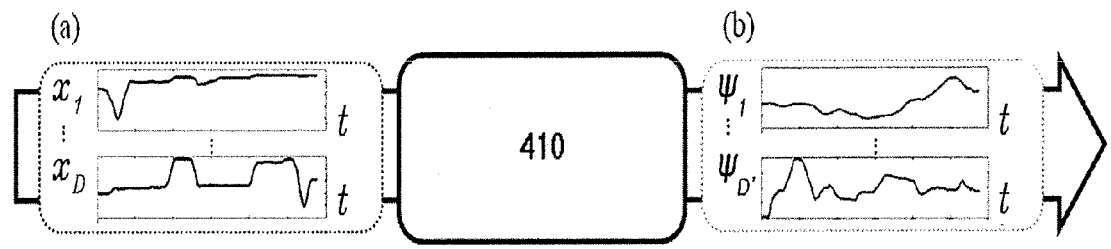
FIGS. 4a to 4f are diagrams for consecutively illustrating the process of generating a segmentation point for segmenting training data in the modeling method for learning a task skill according to an embodiment of the present disclosure.
Figure 4B:
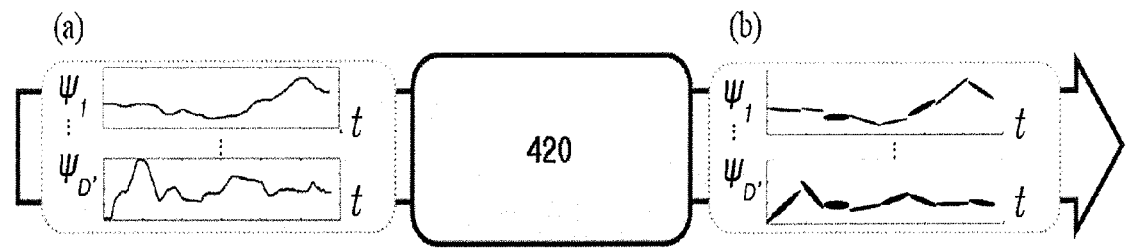
Figure 4C:
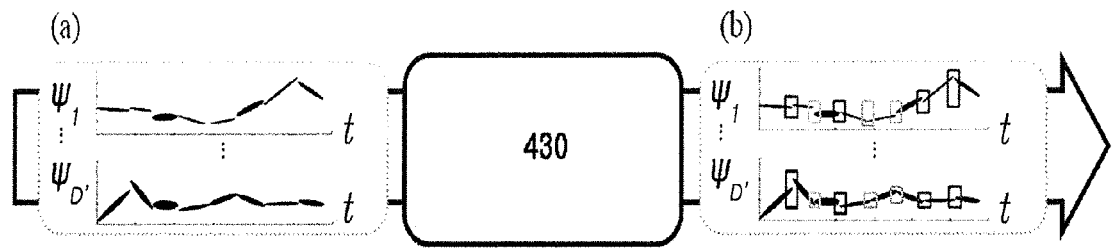
Figure 4D:
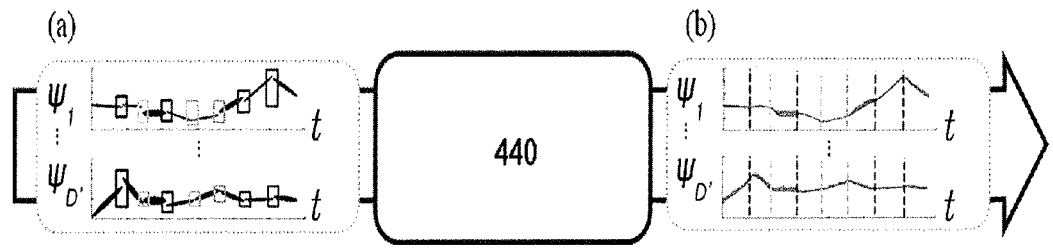
Figure 4E:
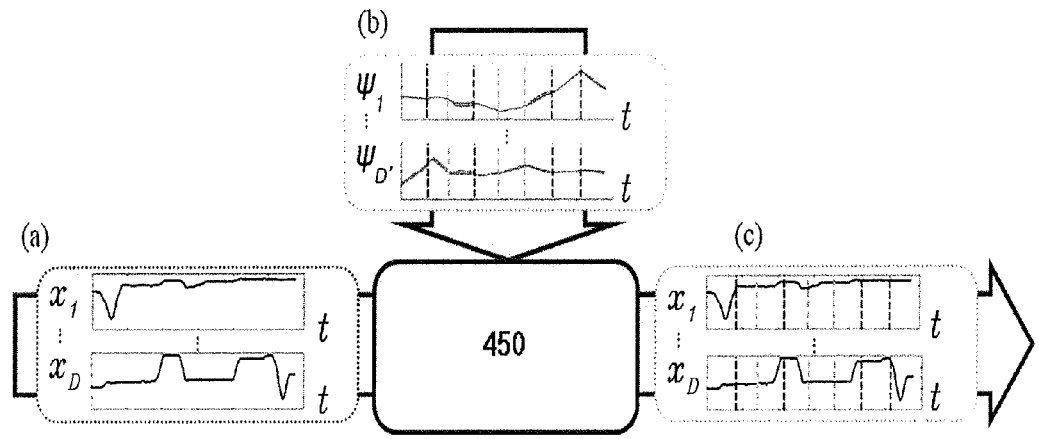
Figure 4F:
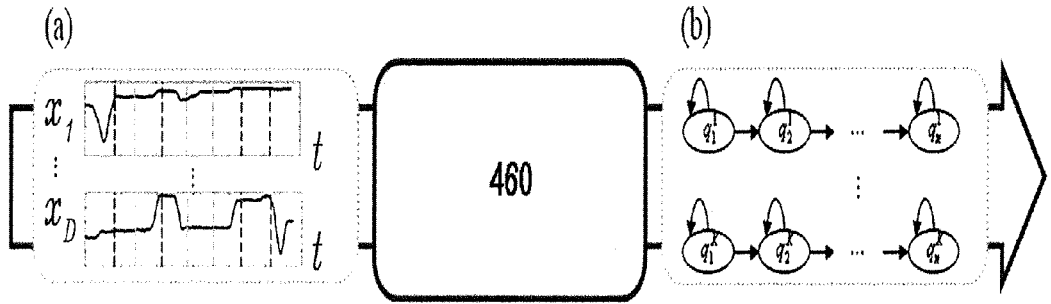

FIG. 4a illustrates Operation 410 of reducing the dimension of training data in order to extract a segmentation point from the received training data. In other words, Operation 410 shows that the dimension of the original training data is reduced by means of PCA. FIG. 4b illustrates Operation 420 of modeling a Gaussian mixture model in order to automatically determine the number of segmentation points. By means of Operation 420, in this embodiment, the Gaussian mixture model is modeled by means of EM algorithm and BIC. FIG. 4c illustrates Operation 430 of extracting a candidate region in order to extract the segmentation point at a region where mixture components of the Gaussian mixture model overlap each other. By means of Operation 430, in this embodiment, a window is generated by interpreting geometric properties of the Gaussian mixture model. FIG. 4d illustrates Operation 440 of extracting segmentation points in the candidate region. By means of Operation 440, in this embodiment, a segmentation point may be extracted from the window by interpreting geometric properties of the Gaussian mixture regression. FIG. 4e illustrates Operation 450 of segmenting and modeling the training data by using the segmentation point. Therefore, in Operation 450, the original training data and the segmentation point extracted in Operation 440 are input as input values. Finally, FIG. 4f illustrates Operation 460 of modeling a hidden Markov model by using a K segment set for classifying new training data, while will be described later with reference to FIG. 5.

Figure 5:
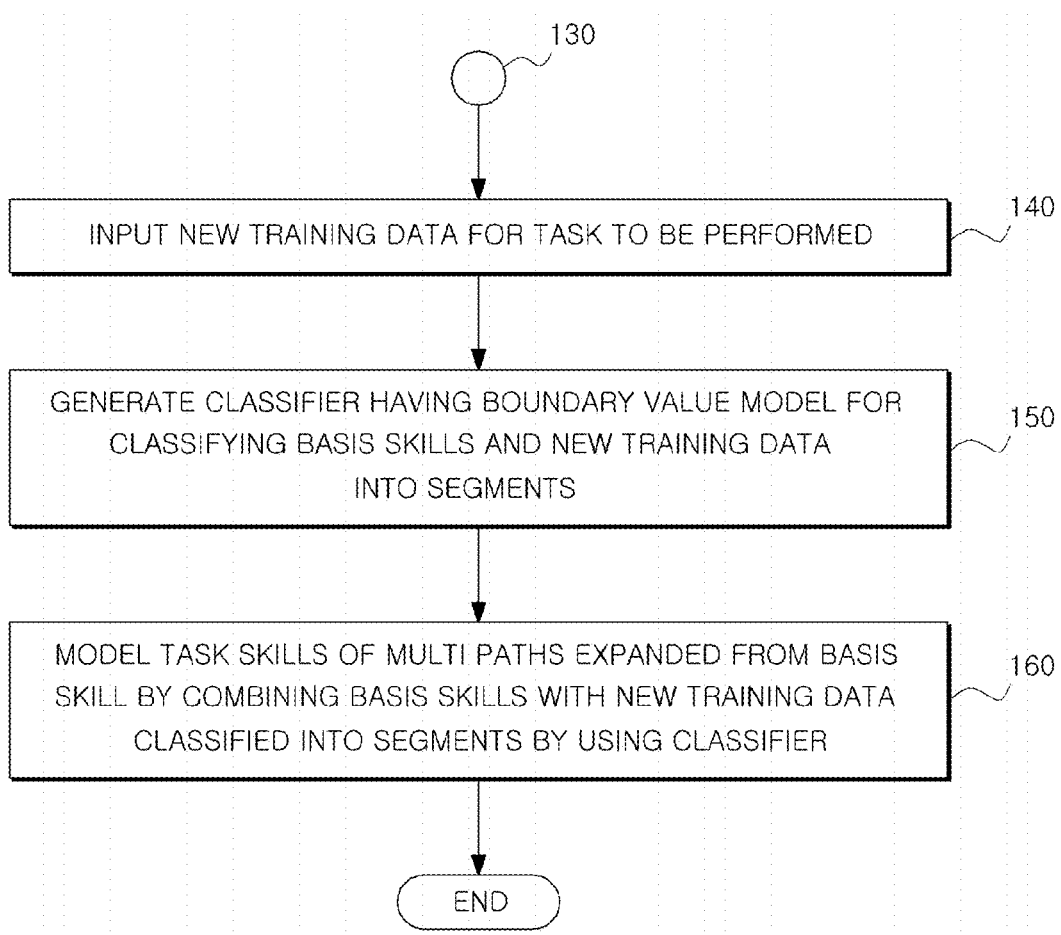
FIG. 5 is a flowchart for illustrating a method for modeling task skills of multi paths expanded from a basis skill by using the modeling method of FIG. 1 according to another embodiment of the present disclosure.

FIG. 5 is a flowchart for illustrating a method for modeling task skills of multi paths expanded from a basis skill by using the modeling method of FIG. 1 according to another embodiment of the present disclosure. In FIG. 5, in addition to the modeling method for learning a basis skill as shown in FIG. 1, a classifier for modifying the basis skill is generated, and the basis skill is newly learned. The basis skill may be expanded as a hidden Markov model of multi paths by being combined with a new hidden Markov model based on Kullback-Leibler (KL) divergence. The new hidden Markov model is modeled by using new training data which is classified based on the classifier. The multi-path hidden Markov model may be utilized for regenerating similar multi paths for performing the given task.

In Operation 140, the learning engine receives new training data for a task to be performed. This operation may be performed similar to Operation 110 of FIG. 1, described above.

In Operation 150, the learning engine generates a classifier having a threshold model for classifying the basis skill and the new training data input in Operation 140 into segments.

As described above, the existing basis skills and new basis skills should be gradually modified or added. For this purpose, the classifier is generated to classify new training data. Therefore, the K number of basis skills is modeled as a hidden Markov model by using the K number of training data which are segmented by the (K−1) number of segmentation points. Parameters of the hidden Markov model are defined as in Equation 11 below.

$\lambda_i = \{\pi_i, A_i, B_i\}$   Equation 11

Here, $\pi_i$, $A_i$, and $B_i$ respectively represent prior probability, transition probability and observation probability of the hidden Markov model for the $i^{th}$ segment of the training data. Since tasks to be performed have time continuity in a single direction, the hidden Markov model is modeled as a left-right hidden Markov model. Parameters $\lambda_i$ of the $i^{th}$ hidden Markov model are estimated by using the Baum-Welch algorithm, and the number of statuses expressing the hidden Markov model may be determined according to BIC. Therefore, the score function of BIC is defined as in Equation 12 below.

$$S_{BIC} = -\log L_i + \frac{n_p}{2}\log(n_i)$$
Equation 12

Here, $L_i$, $n_p$, and $n_i$ respectively represents likelihood of the $i^{th}$ hidden Markov model, the number of free parameters, and the size of the $i^{th}$ segment of the training data. Here, $n_p$ is defined as in Equation 13 below.

$n_p = M + M(M-1)$   Equation 13

Here, M represents the number of statuses.

In this embodiment, the hidden Markov model is used for classifying new training data. In other words, data may be classified as just one of basis skills, not a new skill. Therefore, classifying new training data as an existing basis skill is not appropriate, and a method for generating a new basis skill by using new data is required. For this, in this embodiment, a threshold model is utilized to classify a non-gesture portion from the training data where gestures are combined. The threshold model is generated as an ergodic hidden Markov model by using certain statuses of the hidden Markov model belonging to gestures. In order to add a new basis skill, in this embodiment, the threshold model is generated as an ergodic hidden Markov model for all statuses except for the first and final statuses. For example, the threshold model may be generated by two dummy statuses (namely, which represent start and end statuses). Now, the transition probability is allocated as in Equation 14 below.

$$a_{si} = \frac{1}{n},$$
$$a_{ie} = 1 - a_{ii}, \forall i$$
Equation 14

Here, $a_{si}$ and $a_{ie}$ represent transition probability from the start status to an $i^{th}$ status and transition probability from the $i^{th}$ status to the end status. N represents the number of all statuses except for two dummy statuses. The observation probability of statuses uses one of existing skills identically. In the final stage, initial probabilities are regularly allocated.

Figure 6:
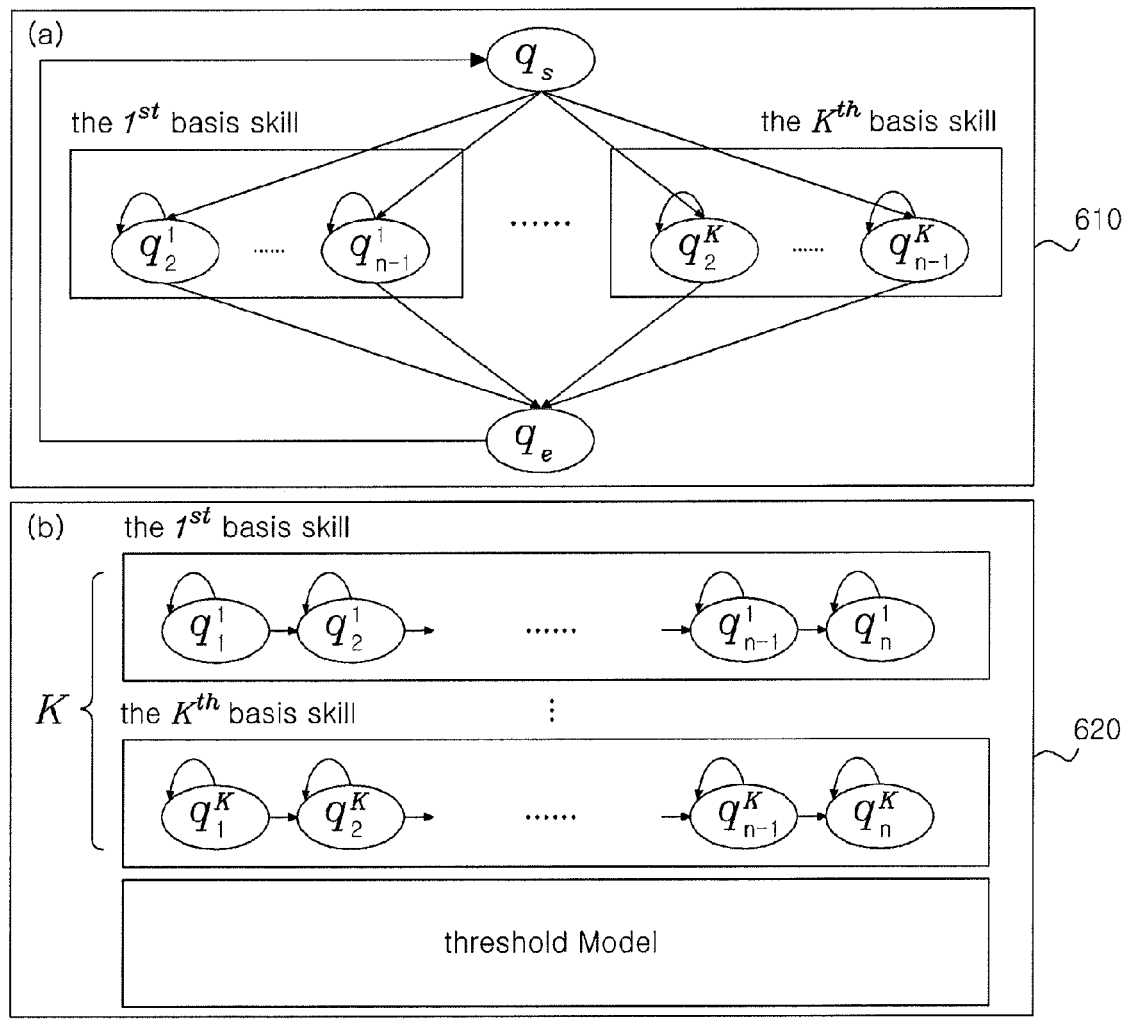
FIG. 6 is a diagram for illustrating a method for generating a classifier for classifying new training data in the modeling method of FIG. 5 according to another embodiment of the present disclosure.

FIG. 6 is a diagram for illustrating a method for generating a classifier for classifying new training data in the modeling method of FIG. 5 according to another embodiment of the present disclosure, which corresponds to Operation 150 of FIG. 5. In FIG. 6, Operation 610 represents a threshold model having statuses of the K number of basis skills and two dummy statuses (start and end statuses). In addition, Operation 620 of FIG. 6 represents a classifier having the K number of basis skills and the threshold model.

Referring to FIG. 5 again, in Operation 160, the learning engine models task skills of multi paths expanded from the basis skills by combining the already learned basis skills with new training data classified into segments by using the classifier generated in Operation 150. This process preferably generates a model of a single path or multi paths with divergence by combining the learned basis skills with new training data classified into segments, based on the Kullback-Leibler (KL) divergence.

In more detail, the basis skills modeled as a hidden Markov model should be corrected by new training data gradually classified. For this, this embodiment will use a method of combining two hidden Markov models based on the KL divergence.

First, in order to correct an existing basis skill, new training data is modeled as a hidden Markov model having a parameter $\lambda_N = \{\pi_N, A_N, B_N\}$ and a status $Q_N = \{q_N^1, \ldots, q_N^m\}$. All statuses of $\lambda N$ are combined, or they are inserted into the classified basis skills having a parameter $\lambda_C = \{\pi_C, A_C, B_C\}$ and a status $Q_C = \{q_C^1, \ldots, q_C^m\}$ based on the KL divergence. Here, the observation probability of the status qi has a Gaussian distribution $N(\mu^i, \Sigma^i)$. The KL divergence is calculated by using mean and covariance of the observation probability of two hidden Markov models, and is defined as in Equation 15 below.

$$D_{KL}(q_n^i \| q_C^i) = \frac{1}{2}\left(\log\frac{|\Sigma_N^i|}{|\Sigma_C^i|} + tr((\Sigma_N^i)^{-1}\Sigma_C^i) + (\mu_N^i - \mu_C^i)^T(\Sigma_N^i)^{-1}(\mu_N^i - \mu_C^i) - n\right)$$

Equation 15

Here, $q_N^i$ and $q_C^i$ represent an $i^{th}$ status of a new hidden Markov model and a classified hidden Markov model, $\mu_N^i$ and $\Sigma_N^i$ represent mean and covariance of the observation probability of the $i^{th}$ status of the new hidden Markov model, and $\mu_C^i$ and $\Sigma_C^i$ represent mean and covariance of the observation probability of the $i^{th}$ status of the classified hidden Markov model.

In the case where DKL is smaller than a boundary value, two statuses are combined to form a single status of the classified hidden Markov model. Here, combined parameters $\mu i$ and $\Sigma i$ of the observation probability are calculated according to Equation 16 and Equation 17 below.

$$(\Sigma^i)^{-1} = w(\Sigma_N^i)^{-1} + (1-w)(\Sigma_C^i)^{-1}$$

Equation 16

$$\mu^i = \Sigma^i(w(\Sigma_N^i)^{-1}\mu_N^i + (1-w)(\Sigma_C^i)^{-1}\mu_C^i)$$

Equation 17

Here, w represents a weight parameter which controls the level of contribution from each status. Since two statuses contribute identically, in this embodiment, the condition w=0.5 may be used. Further, transition probabilities are allocated by normalized values of the sum of existing transition probabilities. However, in the case where DKL is greater than the boundary value, the status $q_N^i$ is inserted into the classified hidden Markov model.

In order to determine combination or insertion of statuses, the boundary values of DKL should be determined. This is performed by using minimal DKL among all statuses of the classified hidden Markov model, and is defined as in Equation 18 below.

$$D_{threshold} = \min_{\forall i,j,i\neq j} D_{KL}(q_C^i \| q_C^j)$$

Equation 18

Here, qc represents a status of the classified hidden Markov model. Dthreshold represents a minimal inter-distance among all statuses of the classified hidden Markov model. As a result, similar statuses of two hidden Markov models are combined, and non-similar statuses are inserted. The inserted statuses generate multi paths in the classified hidden Markov model, thereby providing a multi-path hidden Markov model which may regenerate multi paths for accomplishing the given task.

In brief, Operation of modeling task skills of multi paths includes calculating a threshold value for the Kullback-Leibler divergence and the Kullback-Leibler divergence between the model for the learned basis skill and the model for the new training data, and comparing the Kullback-Leibler divergence with the threshold value. The threshold value may be set to be a minimal value for all statuses between the model for the basis skill and the model for the new training data. After that, as a result of the comparison, if the Kullback-Leibler divergence is smaller than the threshold value, the model for the new training data is incorporated into the model for the basis skill to generate a model with a single path. Meanwhile, if the Kullback-Leibler divergence is equal to or greater than the threshold value, the model for the new training data is added to the model for the basis skill to generate a model with a divergence.

Figure 7:
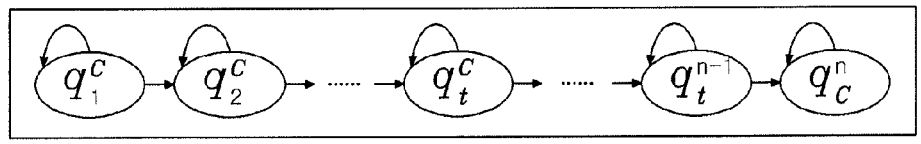
FIG. 7 is a diagram for illustrating the process of modeling task skills of multi paths by gradually improving and expanding the basis skill in the modeling method of FIG. 5 according to another embodiment of the present disclosure.
Figure 7:
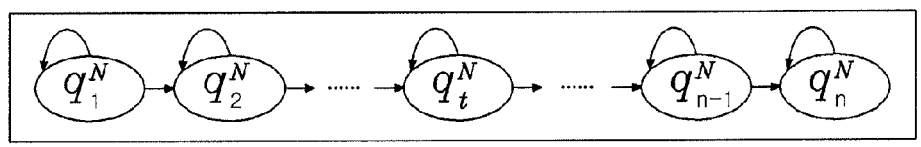
Figure 7:
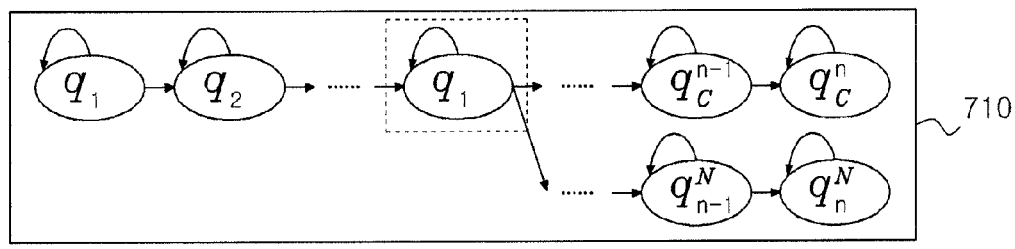
Figure 7:
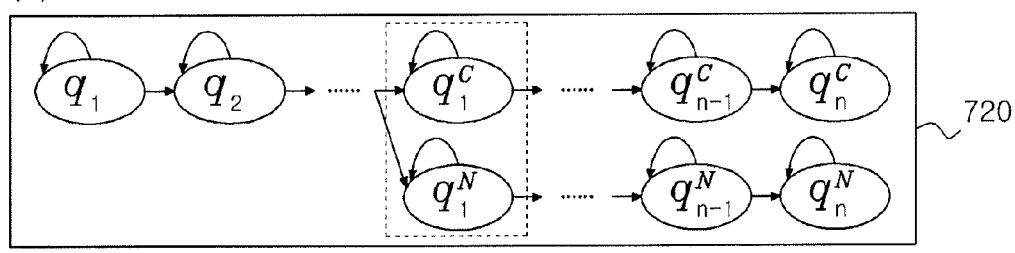

As shown in FIG. 7, classifiers are composed of basis skills and threshold models. The classifiers calculate log-likelihood by using a forward algorithm of the hidden Markov model. If new training data is classified as a basis skill, existing basis skills are corrected by the training data. Meanwhile, if new training data is classified as a threshold model, a new basis skill is added by the training data. As described above, the threshold model is continuously updated according to the corrected statuses of the basis skills. In FIG. 7, Operation 710 illustrates the case where statuses of two hidden Markov models are combined to correct the basis skill, and Operation 720 illustrates the case where a status of a new hidden Markov model is inserted into the classified basis skill to expand the basis skill.

Figure 8:
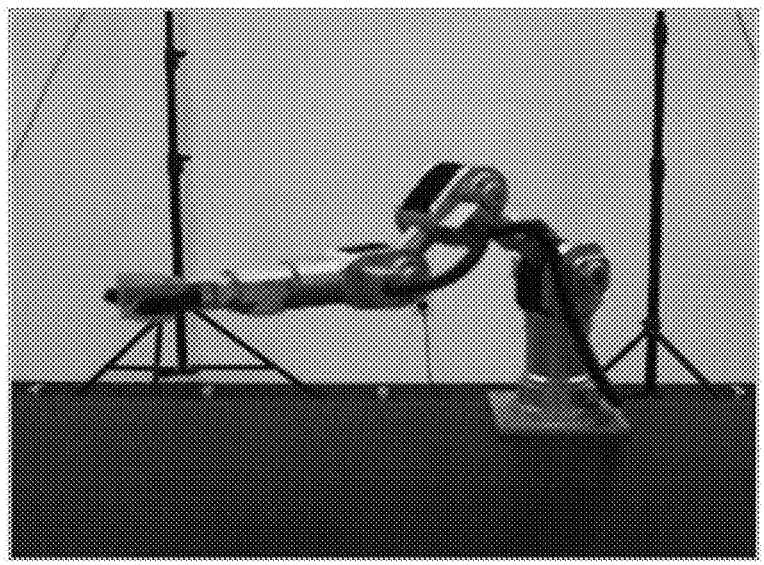
FIG. 8 is a diagram exemplarily showing a robot which may be utilized under an environment where embodiments of the present disclosure are implemented.

FIG. 8 is a diagram exemplarily showing a robot which may be utilized in an environment where the embodiments of the present disclosure are implemented. Even though FIG. 8 shows a single robot arm controlled by at least one microprocessor, it could be understood by those having ordinary skill in the art that this robot may be utilized in connection with various mechanical driving units.

In the embodiments of the present disclosure which are described below and illustrated in FIG. 8 or the like, a task such as writing a letter, drawing a picture (trajectory), picking an article and moving it from one place (a start point) to another place (a target point), or the like is performed by a single robot arm. In each embodiment, a given task will be introduced, and a skill learning process of a robot for the task will be described. As briefly introduced above, these embodiments allows not only learning a task skill for a given task to perform the task as learned but also modifying the corresponding model based on the learned model to generate and perform the skill along various paths.

In a related technique, even though there may be provided some technical measures to express or regenerate a task skill for an intelligent robot, the increase of a scale (which means a scale of mechanical movement or trajectory of a driving unit) of the corresponding task skill or free movement to another coordinate system (for example, even though a task skill of writing a letter on a floor, it is impossible to write the same letter on a wall) has not been considered. In addition, in the case of expressing and regenerating a skill where a pattern of the path is regarded as important, the situation where a target point is changing continuously is not considered at all, and in the case of expressing and regenerating a skill where a target point considered, minute correction of the path pattern is not considered.

Therefore, the embodiments of the present disclosure set forth below propose a new technique of expressing and regenerating a skill to adapt the skill scale, position variations and external perturbations when an intelligent robot learns a skill. For example, it is assumed that an intelligent robot performs a task of drawing a tetragon on a sketchbook. First, if the intelligent robot learns a method of drawing a tetragon, the intelligent robot should be able to draw the tetragon smaller or greater, and even though the sketchbook is moved (the sketchbook on the floor may be hanged on the wall), the intelligent robot should be able to draw a tetragon according to the moved location of the sketchbook. In addition, the intelligent robot should be able to draw a modified tetragon, namely a trapezoid or parallelogram. For this purpose, training data for performing the task is modeled through Gaussian mixture model (GMM). After that, the modeled GMM is geometrically analyzed, to express the analyzed mixture components as characteristic values and characteristic vectors of prior probability, mean and variance.

This process is designed to utilize the embodiments of the present disclosure in a case where an environment or condition where the task changes or where external perturbations are present. In other words, the modeled GMM should be geometrically changed according to the perturbations and environment changes. Through the above process, a single skill is expressed as mixture components and transformation matrices. At this time, the transformation matrix means a change parameter or factor which may geometrically modify individual components of the modeled task skill corresponding to the given task. Therefore, through the transformation matrices, the intelligent robot according to the embodiments of the present disclosure may learn and perform a modified and expanded task skill.

In addition, the intelligent robot may regenerate a skill based on a dynamical system to which the real-time Gaussian mixture regression (GMR) is applied. At this time, the GMR provides a trajectory of mean and variance to the dynamic system at every time or period. This trajectory allows regenerating a reliable path through the proposed dynamic system even in a situation where external perturbations are present. For example, even in an environment where a target location is changing, the intelligent robot according to the embodiments of the present disclosure may adaptively trace the changing target location, thereby performing a given task for the corresponding target location.

Figure 9:
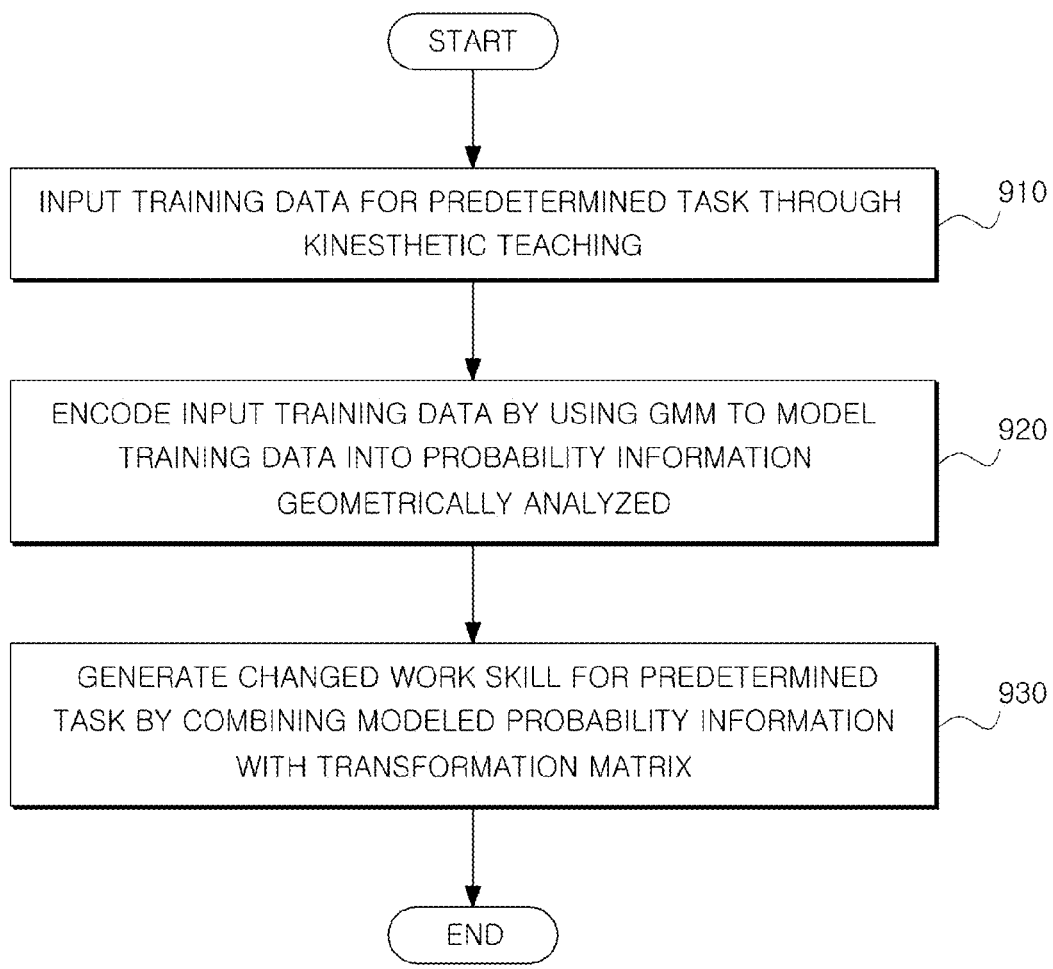
FIG. 9 is a flowchart for illustrating a method for learning a task skill by a learning engine according to an embodiment of the present disclosure.

FIG. 9 is a flowchart for illustrating a method of learning a task skill by a learning engine according to an embodiment of the present disclosure, including methods of geometrically analyzing a task skill to conform to the change of location and scale as well as external perturbations and expressing the skill with mixture components of transformation matrices and GMM.

In addition, a series of processes described below may be performed by a learning engine having at least one processor. In the embodiments of the present disclosure, the process of learning a task skill may be performed by using a program implemented with arithmetic operations and software, but there are also needed a physical operator and a memory for loading and processing data necessary to perform such a series of processes. Therefore, the following processes may be performed by software using a learning engine having at least one hardware processor.

In Operation 910, the learning engine receives training data for a given task through kinesthetic teaching. At this time, the kinesthetic teaching means a process of informing how to perform the corresponding task through a mechanical driving unit in order to teach the learning engine initially. For example, a teacher may directly move a driving unit (which may be a robot arm) of the intelligent robot to demonstrate so that the robot arm writes a letter, or may receive the movement of the teacher so that the learning engine recognizes the corresponding input value (which may be a movement trajectory of the robot arm) as a task skill for writing a letter. In other words, the learning engine may receive training data by measuring each joint angle by using degree of freedom (DOF) given to a joint of the driving unit.

In Operation 920, the learning engine encodes the input training data by using the GMM so that the training data is modeled as geometrically analyzed probability information.

If the training data $X \in \mathbb{R}^{(D+1) \times N}$ is obtained from the given task through the kinesthetic teaching, the training data is modeled using the GMM defined as in the following equation 19. Here, (D+1) is a D-dimensional space parameter, and N represents a scale of the training data.

$$P(X) = \sum_{i=1}^{K} w_i \cdot N(X \mid \mu_i, \Sigma_i) \qquad \text{Equation 19}$$

Here, $w_i$, $\mu_i$, and $\Sigma_i$ are $i^{st}$ mixture components of the GMM, which respectively represent prior probability, mean, and covariance. In addition, $N(X|\mu_i,\Sigma_i)$ represents Gaussian distribution where the mean is $\mu_i$, and the covariance is $\Sigma_i$. As described above, the mixture components include prior probability, mean, and covariance, and at this time, the covariance may be decomposed into a characteristic value and a characteristic vector through the eigen-decomposition. The decomposed equation may be expressed like the following equation 20.

$$\Sigma_i = T_i U_i \Lambda_i^{1/2} (T_i U_i \Lambda_i^{1/2})^T \qquad \text{Equation 20}$$

Here, $\Sigma_i$, $U_i$, and $\Lambda_i$ are respectively a covariance at the $i^{st}$ mixture component, and a characteristic vector and a characteristic value of the distribution, and T represents a transposed matrix. The mixture components obtained as above may be expressed like the following equation 21.

$$\phi_i = \{w_i, \mu_i, U_i, \Lambda_i\} \qquad \text{Equation 21}$$

In other words, the $i^{st}$ mixture components of the GMM shown in the equation 21 are expressed as prior probability, mean, a characteristic vector of the covariance, and a characteristic value of the covariance. As described above, the mixture components are contrived while geometrically analyzing individual components of the corresponding task skill in order to modify the learned task skill.

In Operation 930, the learning engine combines the modeled probability information with the transformation matrix to generate a modified task skill for the given task. In particular, the process of generating the modified task skill is performed by setting a transformation matrix for changing at least one of scale, rotation and movement for the given task, and changing mean and variance of the mixture components, which is geometric information of the modeled probability information, by using the set transformation matrix to generate a modified task skill. At this time, the transformation matrix may be a scaling matrix for changing a scale of a coordinate of the modeled probability information, or a rotation matrix for rotating the coordinate of the modeled probability information. The transformation matrix may be suitably corrected and applied according to an environment where the embodiments of the present disclosure are implemented.

Now, by using the mixture components expressed in Operation 920, a single task skill may be expressed as a combination of the mixture component of the GMM and the transformation matrix like the following equation 22.

$$\Omega = <T, \Phi> \qquad \text{Equation 22}$$

Here, $T=\{T_1, \ldots, T_K\}$ and $\Phi=\{\phi_1, \ldots, \phi_K\}$ respectively represent the transformation matrices and the mixture components. The transformation matrices may be replaced with various matrices to change the geometric information (which means mean and variance of the mixture components), and therefore a scale, rotation or movement may be added to the corresponding task skill. Each mixture component may be changed as shown in the following equations 23 and 24.

$$\mu_i = T_i(\mu_i - \mu_r) + \mu_r \qquad \text{Equation 23}$$

$$\Sigma_i = T_i U_i \Lambda_i^{1/2} (T_i U_i \Lambda_i^{1/2})^T \qquad \text{Equation 24}$$

The meaning of each symbol has already been described in the above equations.

In addition, it has been mentioned that such transformation matrices may be replaced with various kinds of other matrices, and hereinafter, a scaling matrix for increasing or decreasing the scale of a path of a task skill and a rotation matrix for rotating the shape will be introduced as examples.

The components obtained by geometric analysis of the GMM may be combined with a scaling matrix as mentioned above to increase or decrease a scale of a path for the task skill. This 3-dimensional scaling matrix $S \in \mathbb{R}^{(3+1) \times (3+1)}$ may be expressed like the following equation 25.

$$S = \begin{bmatrix} 1 & 0 & 0 & 0 \\ 0 & v_x & 0 & 0 \\ 0 & 0 & v_y & 0 \\ 0 & 0 & 0 & v_z \end{bmatrix} \qquad \text{Equation 25}$$

Here, $v_x$, $v_y$, and $v_z$ respectively mean parameter values for adjusting the scale at a rectangular coordinate system, and the scale may be adjusted to a desired coordinate axis by adjusting these parameter values. Further, in the equation 25, the $1 \times 1^{st}$ component of the transformation matrix will be 1. It is because adjusting the scale for the time is not necessary in the component of the GMM.

Meanwhile, similar to the scaling matrix described above, the task skill may be rotated by replacing the above transformation matrix with a rotation matrix, and this rotation matrix may be expressed like the following equation 26.

$$R = \begin{bmatrix} 1 & 0 & 0 & 0 \\ 0 & c_y^\theta c_z^\psi & -c_x^\varphi s_z^\psi + s_x^\varphi s_y^\theta c_z^\psi & s_x^\varphi s_z^\psi + c_x^\varphi s_y^\theta c_z^\psi \\ 0 & c_y^\theta s_z^\psi & c_x^\varphi c_z^\psi + s_x^\varphi s_y^\theta s_z^\psi & -s_x^\varphi c_z^\psi + c_x^\varphi s_y^\theta s_z^\psi \\ 0 & -s_y^\theta & s_x^\varphi c_y^\theta & c_x^\varphi c_y^\theta \end{bmatrix} \qquad \text{Equation 26}$$

Here, x, y, z, $\phi$, $\theta$, and $\psi$ respectively mean rotation and rotation angle from the x, y, and z axes at a rectangular coordinate system, and c and s represent cosine and sine. By adjusting these $\phi$, $\theta$, and $\psi$, the task skill may be rotated as desired by the user. The mean and variance at the mixture component of the GMM newly generated may be divided into time-associated variables and space-associated variables, and this may be expressed like the following equations 27 and 28.

$$\mu_i = \{\mu_{i,t}, \mu_{i,x}\} \qquad \text{Equation 27}$$

$$\Sigma_i = \begin{pmatrix} \Sigma_{i,t} & \Sigma_{i,tx} \\ \Sigma_{i,xt} & \Sigma_{i,x} \end{pmatrix} \qquad \text{Equation 28}$$

Here, i represents $i^{st}$ GMM, t is a parameter associated with time, and x represents a D-dimensional variable associated with space. Here, the variables associated with time may generate a generalized trajectory of mean and variance according to the inquiry at each time through the real-time GMR.

The following equations 29 and 30 generate a generalized trajectory of mean and variance according to time.

$$\mu_x(t) = \sum_{i=1}^{K} h_i(t)(\mu_{i,x} + \Sigma_{i,xt} \Sigma_{i,t}^{-1}(t - \mu_{i,t})) \qquad \text{Equation 29}$$

$$\Sigma_x(t) = \sum_{i=1}^{K} h_i^2(t)(\Sigma_{i,x} - \Sigma_{i,x,t} \Sigma_{i,t}^{-1} \Sigma_{i,tx}) \qquad \text{Equation 30}$$

Here, $h_i(t)$ is defined as shown in the following equation 31.

$$h_i(t) = \frac{w_i N(t; \mu_{i,t}, \Sigma_{i,t})}{\sum_{k=1}^{K} w_k N(t; \mu_k, \Sigma_{k,t})} \qquad \text{Equation 31}$$

The trajectory of mean and variance generated in real time may be used as a target location and stiffness of a dynamic system. Therefore, the dynamical system made using a quadratic differential equation may be defined like the following equation 32.

$$\hat{\ddot{x}} = K^p(x_g - x) - K^v \dot{x} \qquad \text{Equation 32}$$

Here, $K^p$, $K^v$, $x_g$, $\dot{x}$, and $\hat{\ddot{x}}$ respectively means stiffness, a braking factor, a target location, a current location, a current speed, and an estimated acceleration. If the mean and variance according to time, obtained above, is applied to the dynamic system of the equation 32, the following equation 33 may be defined.

$$\hat{\ddot{x}}(t) = K^p(t+1)(\mu_x(t+1) - x(t)) - K_v \dot{x}(t) \qquad \text{Equation 33}$$

Here, $K^p(t+1) = \Sigma_x^{-1}(t+1)$ and $\mu_x(t+1)$ means t+1 step of the trajectory of mean and variance mentioned above, and $K^v$ is a set parameter value corresponding to a constant.

As a result, the trajectory generated through the Gaussian regression calculated in real time is regenerated by the dynamical system based on the quadratic differential equation, and so a reliable path is generated in spite of external perturbations.

Now, a schematic diagram of the above dynamic system will be described in brief with reference to FIG. 10.

Figure 10:
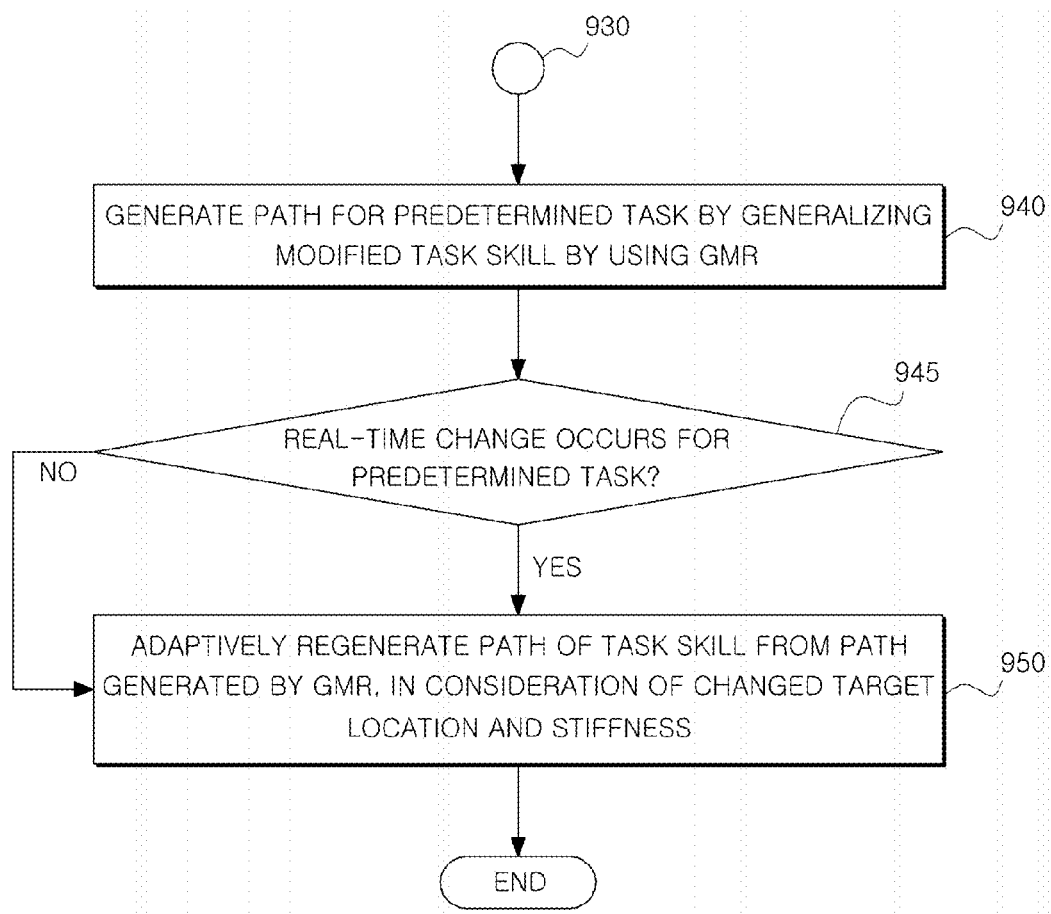
FIG. 10 is a flowchart for illustrating a method for adaptively learning a task skill according to a given situation in the method of FIG. 9 according to an embodiment of the present disclosure.

FIG. 10 is a flowchart for illustrating a method for adaptively learning a task skill according to a given situation in the method of FIG. 9 according to an embodiment of the present disclosure, and an operation of a dynamical system (an online GMR-based dynamical system) based on real-time GMR capable of regenerating a skill adaptive to external perturbations occurring in real time to perform the given task is illustrated. In FIG. 10, it is assumed that Operations 910 to 930 of FIG. 9 are already performed to generate a modified task skill.

In Operation 940, the learning engine generalizes the modified task skill by using the GMR to generate a path for the given task. In other words, a trajectory of mean and variance is generated by using the real-time GMR. After that, if a real-time change occurs to the given task through the checking in Operation 945, the process proceeds to Operation 950.

In Operation 950, in a case where a real-time change occurs for the given task, in consideration of the changed target location and stiffness, the learning engine adaptively regenerate a path of the task skill from the path generated through the GMR. In other words, the trajectory of mean and variance generated through Operation 940 is used to generate a target of the dynamic system in real time, and the trajectory of variance is used to generate the stiffness of the dynamic system in real time so that a skill is regenerated.

Now, a process of performing various given tasks by using the technical units described above in the embodiments of the present disclosure will be introduced. In order to show the embodiment for the technical unit proposed above, three kinds of tasks are assumed. The given tasks exemplarily include (1) 'drawing a figure', (2) 'commanding', and (3) 'cup transferring'.

Figure 11:
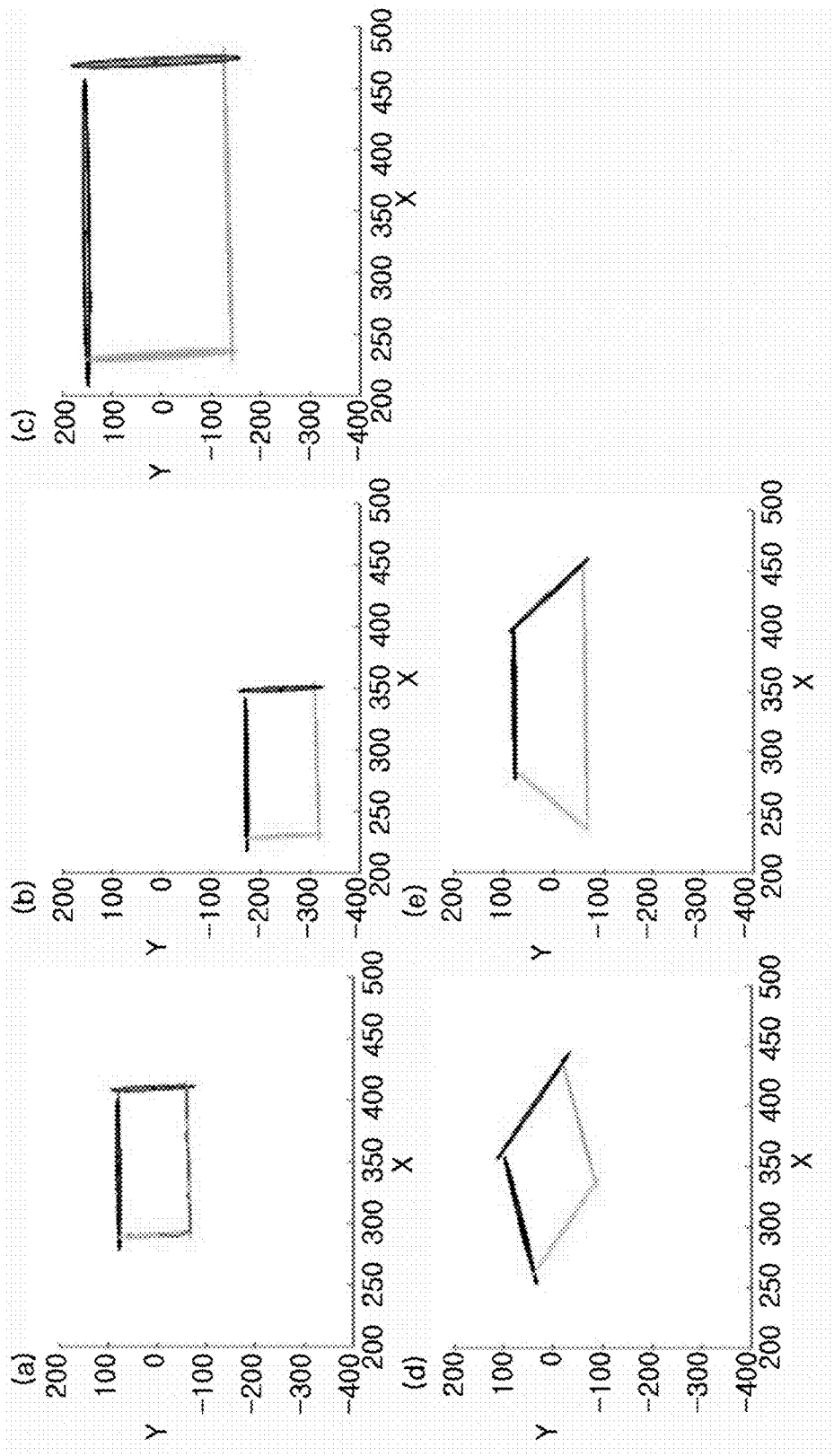
FIG. 11 is a diagram exemplarily showing a modified Gaussian mixture model (GMM) for a 'tetragon drawing' task.

FIG. 11 associated with 'drawing a figure' which is the first task exemplarily shows a modified GMM for a 'tetragon drawing' task, and a result graph is depicted to show the changes of scale, location and shape of each figure.

In order to perform the tetragon drawing task, first, training data suitable for the task is obtained through kinesthetic teaching. The obtained data is modeled through GMM, and at this time the number of GMM is determined by the user. In the 'tetragon drawing', the number of models is exemplarily 4. The modeled skill is combined with a transformation matrix to be modified again.

FIG. 11 shows models obtained by modifying GMMs at the 'tetragon drawing' task by using a transformation matrix. In FIG. 11, (a) is a GMM modeled through training data of the 'tetragon drawing' task, (b) is a GMM which is moved −60 mm in the x axis −250 mm in the y axis, and (c) is a GMM whose scale is doubled. In addition, (d) is a GMM which is rotated by 30 degrees in the z axis, and (e) is a GMM having a trapezoidal shape generated by rotating each mixture component and increasing the scale of each mixture component. As described above, the modified GMM is generalized through the GMR in order to generate a path suitable for each task.

Figure 12:
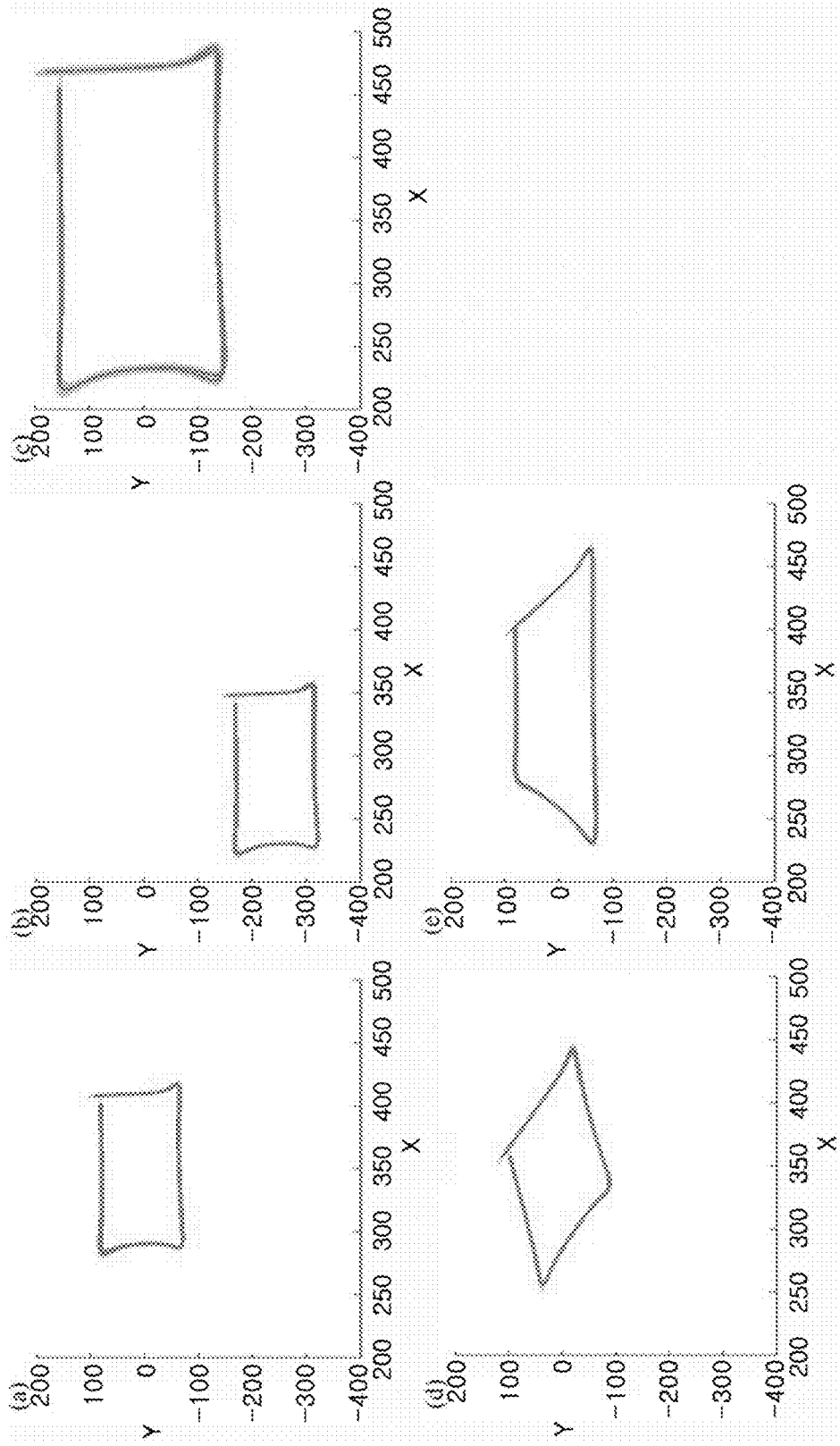
FIG. 12 is a diagram exemplarily showing a result of Gaussian mixture regression (GMR) performed by the GMM of FIG. 11.

FIG. 12 is a diagram exemplarily showing a result of the GMR performed by the GMM of FIG. 11.

In FIG. 12, (a) is a GMR obtained through (a) of FIG. 11, (b) of FIG. 12 is a GMR obtained through (b) of FIG. 11, and (c) of FIG. 12 is a GMR obtained through (c) of FIG. 11. In addition, (d) of FIG. 12 is a GMR obtained through (d) of FIG. 11, (e) of FIG. 12 is a result figure of a GMR obtained through (e) of FIG. 11. Now, the trajectory of mean and variance obtained through the GMR is applied to the target location and stiffness of the dynamical system to regenerate a path for the task skill.

Figure 13:
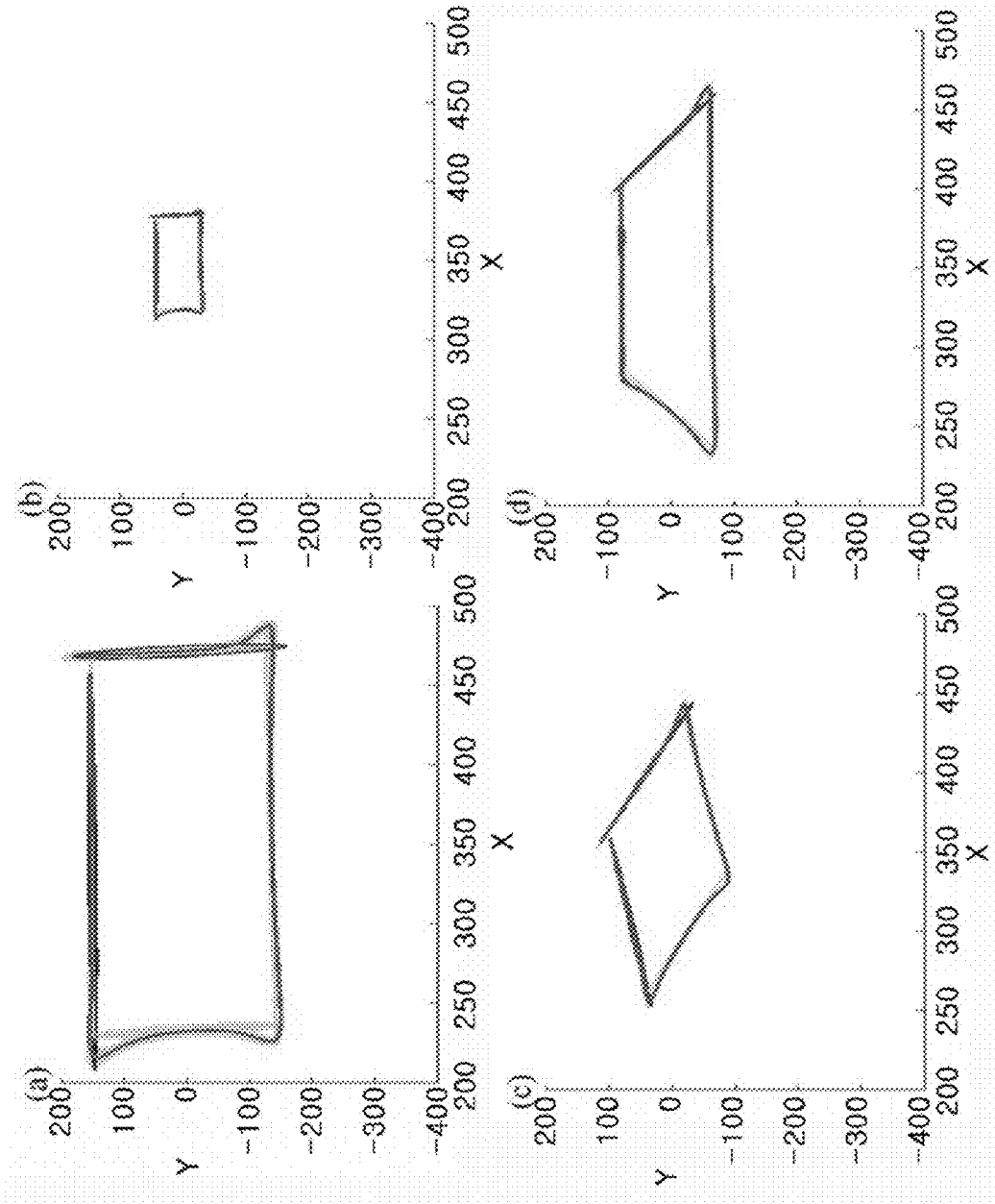
FIG. 13 is a diagram exemplarily showing a path regenerated from the GMM of FIG. 11 and the GMR of FIG. 12.

FIG. 13 is a diagram exemplarily showing a path regenerated from the GMM of FIG. 11 and the GMR of FIG. 12. In FIG. 13, a red line represents a regeneration path, which is illustrated as being generated along the mean and variance of the GMR generated in real time.

Figure 14:
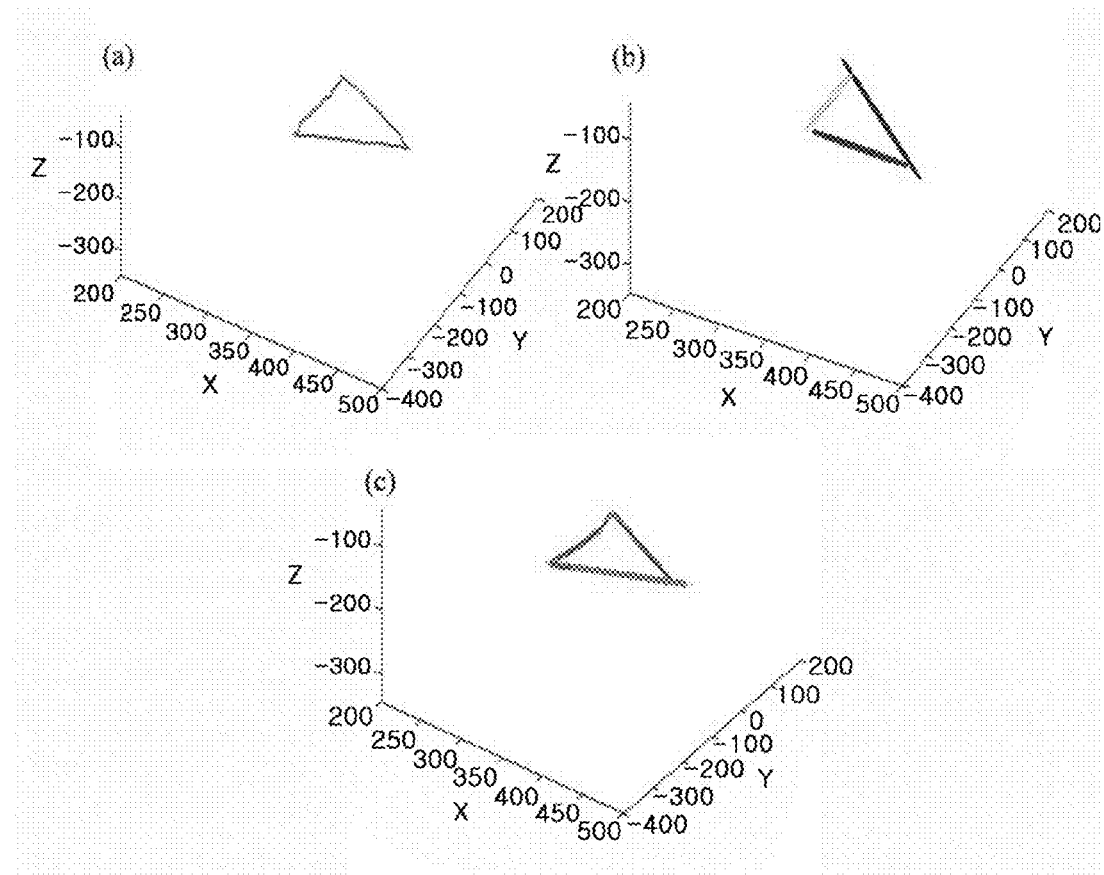
FIG. 14 is a diagram exemplarily showing a result of learning a task skill for a 'triangle drawing' task.

Another example of the 'drawing a figure' which is the first task will be described. The task of drawing a triangle is performed through the same process as the 'tetragon drawing'. FIG. 14 shows this process in brief, and FIG. 15 shows a result from the task of drawing a modified triangle by using a transformation matrix.

FIG. 14 exemplarily shows a result of learning a task skill for the 'triangle drawing' task, where, in FIG. 14, (a) is training data extracted for the 'triangle drawing' task, (b) is a GMM obtained from the training data, and (c) shows a path regenerated by applying the real-time GMR obtained from the mixture model and the mean and variance according to the time to the dynamical system.

Figure 15:
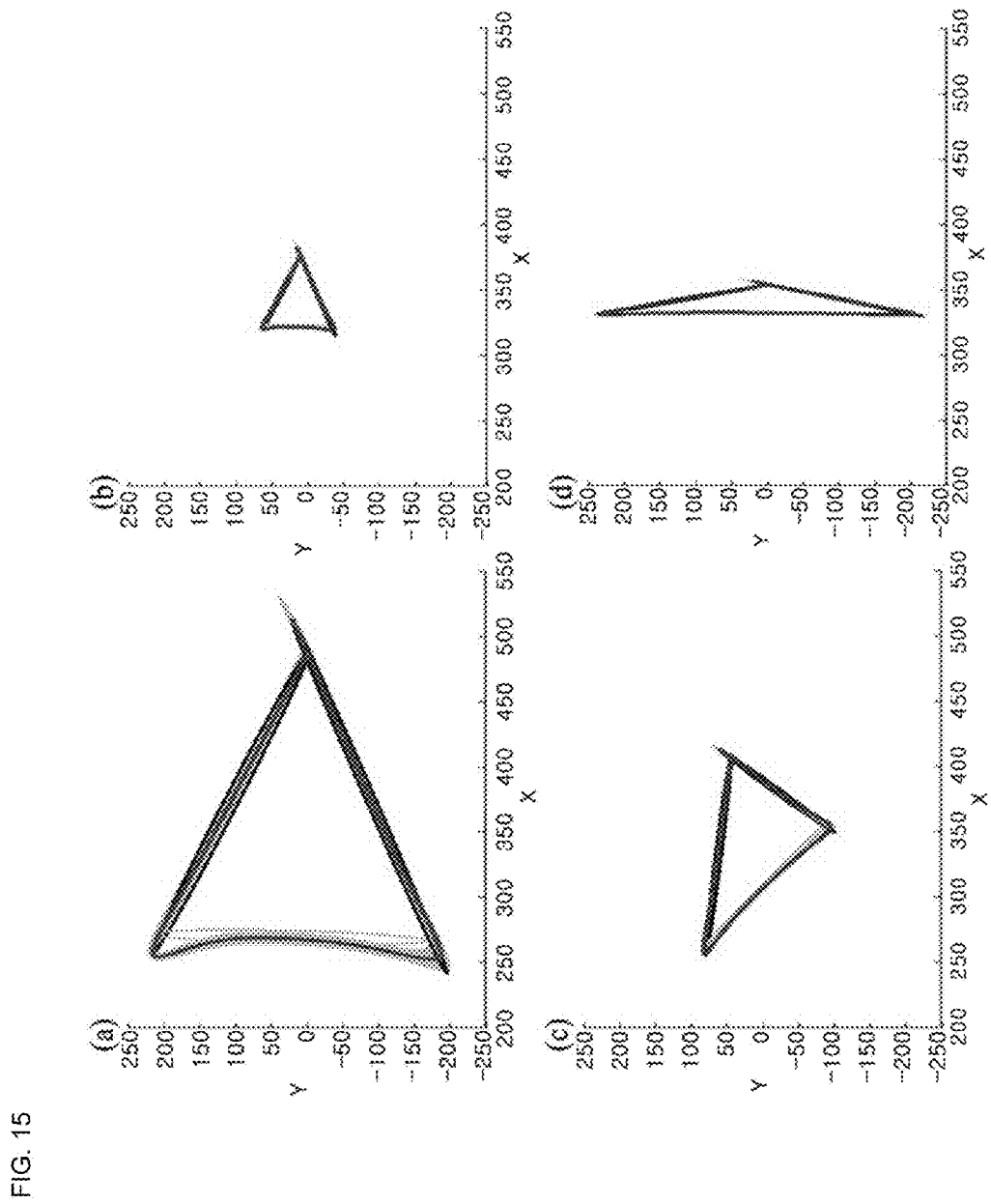
FIG. 15 is a diagram exemplarily showing a path regenerated by modifying the 'triangle drawing' task of FIG. 14.

In addition, FIG. 15 is a diagram exemplarily showing a path regenerated by modifying the 'triangle drawing' task of FIG. 14 by using various transformation matrices.

In FIG. 15, (a) is a figure obtained by replacing the scaling matrix with a transformation matrix to double the scale, and (b) is a figure regenerated by decreasing the scale by half. In addition, (c) is a figure obtained by rotating 30 degrees in the z axis, and (d) is an isosceles triangle generated by rotation and scale change of each mixture component.

Now, 'commanding' which is the second task will be described. The 'commanding' has the same process as the 'drawing a figure' mentioned above, except that more GMMs than before are necessary in order to successively regenerate a complicated path. Therefore, the 'commanding' task uses 10 models.

Figure 16:
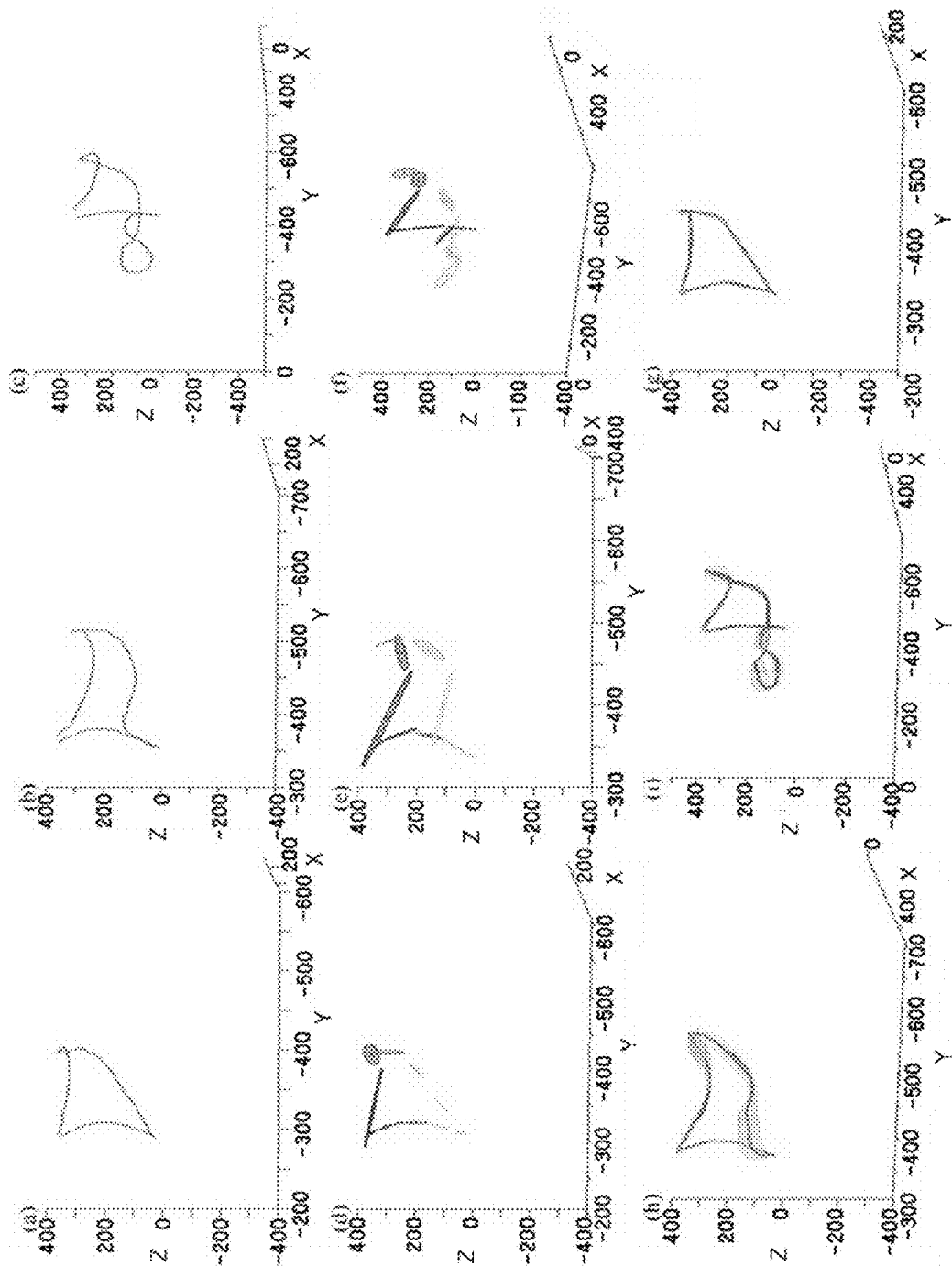
FIG. 16 is a diagram exemplarily showing a result of learning a task skill for a 'commanding' task.

FIG. 16 is a diagram exemplarily showing a result of learning a task skill for the 'commanding' task, which shows each training data for the task commanded in binary time, triple time and quadruple time and GMMs obtained therefrom. In addition, FIG. 16 shows a path regenerated through the dynamic system in consideration of the GMR obtained from the result.

In FIG. 16, (a), (b), and (c) are respectively training data obtained through the kinesthetic teaching for the binary time, triple time and quadruple time commanding tasks, and (d), (e), and (f) respectively show that the training data shown in (a), (b), and (c) is modeled into GMM. In addition, (g), (h), and (i) respectively show paths regenerated through the dynamic system and the real-time GMR for the GMMs of (d), (e), and (f).

As shown in FIG. 16, it could be found that the method for learning a task skill according to the embodiments of the present disclosure performs a task successfully even for a complicated path. In case of a conductor who actually directs an orchestra, it could be found that the conductor directs with great or small motions in order to control a sense of dynamics. The intelligent robot implemented through the embodiments of the present disclosure may also operate similar to the actual figure of such a conductor.

Figure 17:
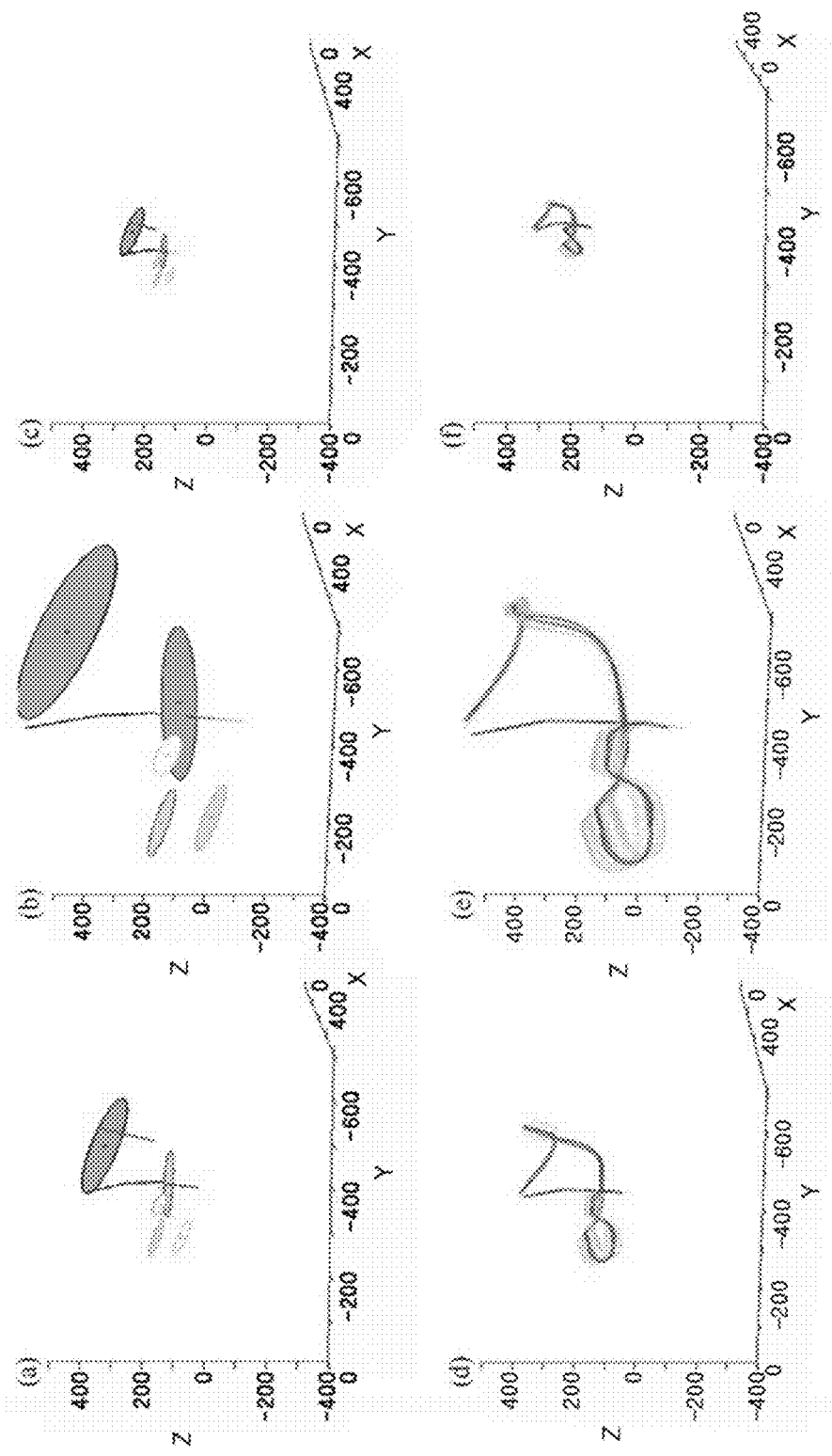
FIG. 17 is a diagram exemplarily showing a path regenerated by modifying the 'commanding' task of FIG. 16.

Next, FIG. 17 is a diagram exemplarily showing a path regenerated by modifying the scale of the quadruple time commanding, among the 'commanding' tasks of FIG. 16, 2 times or 0.5 times.

In FIG. 17, (a) shows a GMM obtained from the training data, (b) is a GMM where the scale of the model of (a) is adjusted doubly, and (c) shows a figure where the model of (a) is reduced in half. In addition, (d), (e), and (f) respectively show real-time GMR through (a), (b), and (c), and a red line represents a path regenerated along the trajectory of mean and variance of the GMR generated in real time.

Finally, the 'cup transferring' which is the third task will be described.

Figure 18:
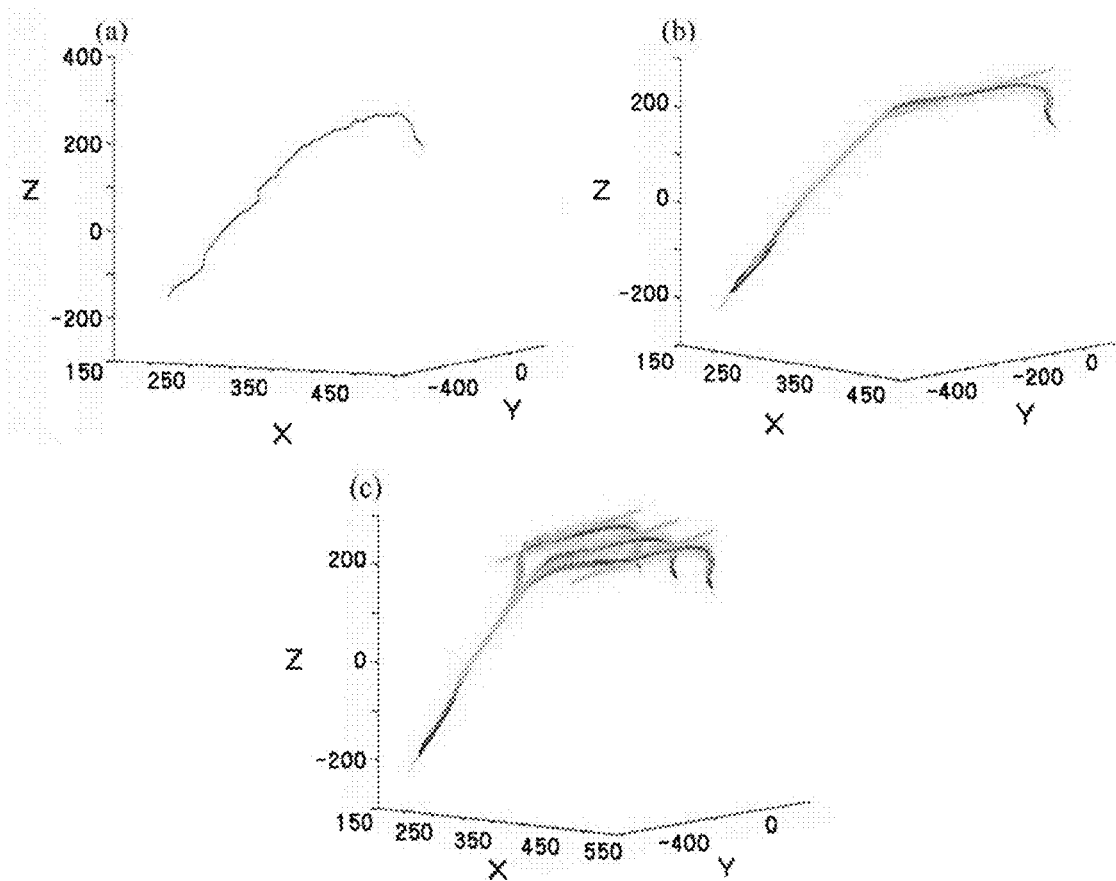
FIG. 18 is a diagram exemplarily showing a path regenerated by adaptively learning a task skill in a case where a 'cup transferring' task changes in real time.

FIG. 18 is a diagram exemplarily showing a path regenerated by adaptively learning a task skill in a case where a 'cup transferring' task changes in real time, and a process of generalizing through the training data, the GMM and the real-time GMR obtained for the corresponding task and changing and regenerating a path to a target point different from the initially learned path through the path regeneration using the dynamic system is illustrated.

In FIG. 18, (a) shows training data for the 'cup transferring' task at a rectangular coordinate system, and (b) exemplarily shows a process where the training data is modeled into a GMM and generalized into a GMR in real time to obtain a target location and stiffness so that a path is regenerated (depicted with a red line) by the dynamical system. In addition, (c) shows a path generated through the same process as above, where a target point is changed in real time and therefore a changed path is regenerated.

Figure 19:
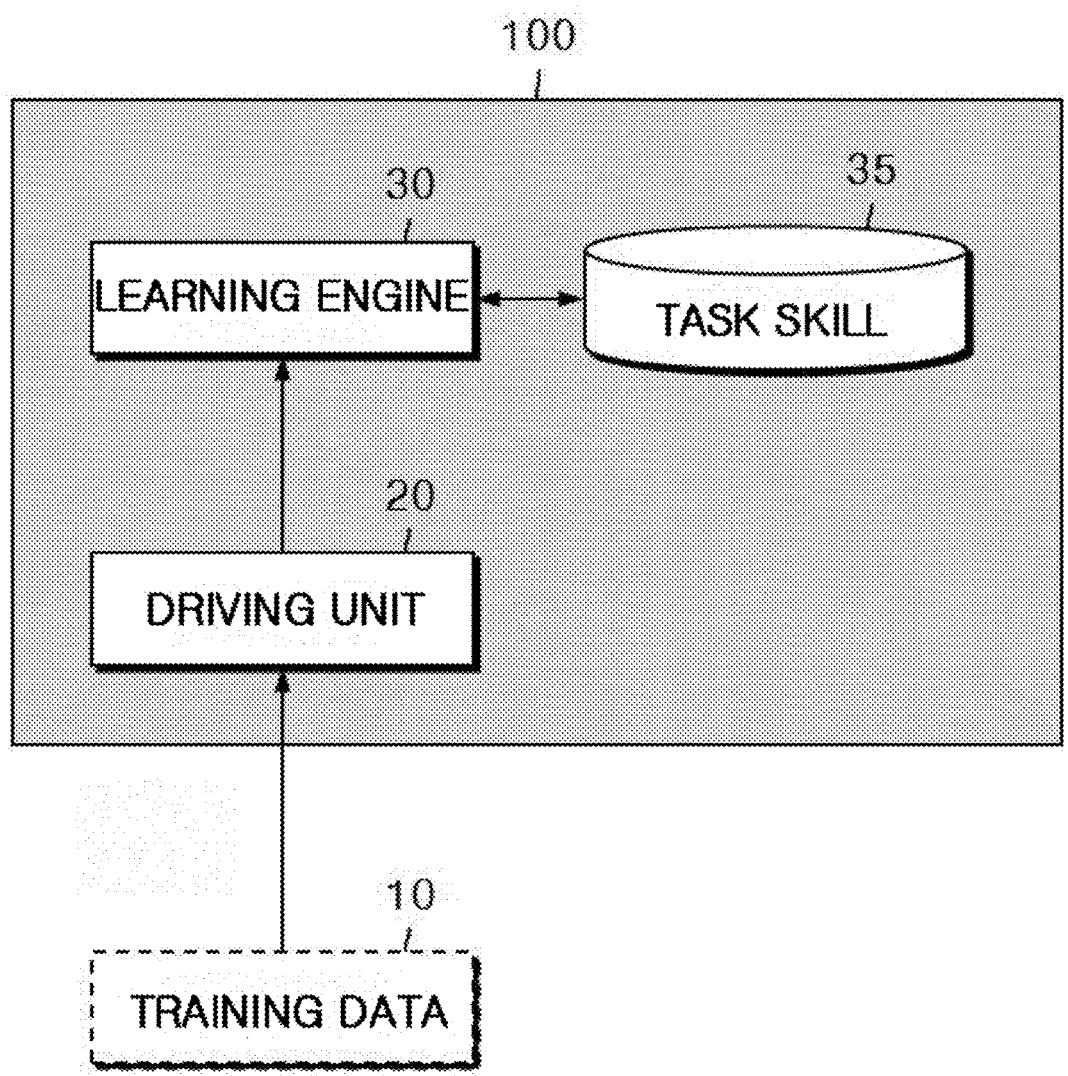
FIG. 19 is a block diagram showing a robot which learns a task skill according to an embodiment of the present disclosure.

FIG. 19 is a block diagram showing a robot which learns a task skill according to an embodiment of the present disclosure, and two embodiments may be implemented by the robot. The operations of the first embodiment correspond to a series of processes of FIGS. 1 and 5, and the operations of the second embodiment correspond to a series of processes of FIGS. 9 and 10. Therefore, in order to avoid duplicated explanation, the operations will be briefly described based on features of hardware configurations.

First Embodiment

The driving unit 20 performs a makes a physical movement to perform the given task. The driving unit 20 means a mechanical structure having degree of freedom (DOF).

The learning engine 30 receives learning data 10 for the given task from the driving unit 20 by means of kinesthetic teaching, divides the training data input from the driving unit 20 into segments by using geometric properties of a probabilistic model, and models each divided segment to learn a basis skill for the divided segment. At this time, the generated task skill and the changed task skill are preferably stored in a specific storing unit 35 so as to be read and utilized as necessary.

According to an embodiment, the learning engine 30 determines a segmentation point by analyzing geometric properties of the Gaussian mixture model and the Gaussian mixture regression for the training data received through the driving unit 20, and divides the training data into segments based on the determined segmentation point. Particularly, the segmentation point is preferably determined by reducing the number of dimensions of the training data by means of the principal component analysis to convert into a dimension, which ensures easy extraction of the segmentation point, generating a Gaussian mixture model by using the converted training data, extracting a window, which is a region where mixture components of the generated Gaussian mixture model overlap each other in time, as a candidate region of the segmentation point, and selecting a point where the covariance calculated by the Gaussian mixture model in the candidate region has a minimal local value as the segmentation point.

Further, the learning engine 30 preferably models task skills of multi paths extended from the learned basis skill by receiving new training data of a task to be performed, generating a classifier configured with a threshold model for classifying the learned basis skill and the new training data into segments, and combining the learned basis skills with the new training data classified into segments by using the generated classifier.

Second Embodiment

Similar to the first embodiment, the driving unit 20 performs a makes a physical movement to perform the given task.

The learning engine 30 receives training data 10 for the given task from the driving unit 20 by means of kinesthetic teaching, encodes the input training data by using GMM to model the training data as probability information geometrically analyzed, and combines the modeled probability information with a transformation matrix to generate a modified task skill for the given task. At this time, the generated task skill and the changed task skill are preferably stored in a specific storing unit 35 so as to be read and utilized as necessary.

According to an embodiment, the transformation matrix may be either a scaling matrix for changing the scale of a coordinate of the modeled probability information or a rotation matrix for rotating a coordinate of the modeled probability information.

In addition, the learning engine 30 may generate a path for the given task by generalizing the modified task skill by using the GMR. Further, in a case where the given task changes in real time, the learning engine 30 adaptively regenerate a path of the task skill from the path generated by the GMR in consideration of the changed target location and stiffness, and forces the driving unit 20 to make a physical movement based on the regenerated path, thereby performing the changed task.

According to the embodiments of the present disclosure, since a basis skill is learned by generating a model from segmented training data for performing a task by using task performing information obtained by a robot without any help of other persons or prior knowledge, a learning model for performing not only an originally given task but also modified or expanded tasks may be easily obtained and reused. In addition, since a new task is recognized based on the learned basis skill and an expanded model is generated to solve the new task, a new basis skill may be flexibly expanded and continuously added.

Further, according to the embodiments of the present disclosure as described above, a skill conforming to the given task as well as a task skill of a modified shape may be learned as the probability information modeled for solving the given task is combined with the transformation matrix, and accordingly, the corresponding task may be performed through the modified task skill even though a work environment or condition changes a little. Further, even under an environment where the task changes in real time, since the path for the modified task skill is adaptively regenerated through the GMR, the corresponding task may be suitably coped with even though the given task changes or there is an external perturbation.

Meanwhile, the embodiments of the present disclosure (particularly, the learning engine proposed in the embodiments) may be implemented as computer-readable codes on a computer-readable medium. At this time, the computer-readable recording medium includes all kinds of recording devices where data readable by a computer system is stored. The computer-readable recording medium may be, for example, ROM, RAM, CD-ROM, magnetic tapes, floppy disks, optical data storages, or the like, and it may also include a device implemented in a carrier wave (for example, transmission through Internet) form. In addition, the computer-readable recording medium may be distributed in a computer system connected by a network so that computer-readable codes are stored and executed in a distributed method. In addition, functional program, codes and code segments for implementing the present disclosure may be easily inferred by programmers in the art.

The present disclosure has been described based on various embodiments. A person having ordinary skill in the art will understand that the present disclosure may be modified without departing from the spirit of the present disclosure. Therefore, the disclosed embodiments should be interpreted not in a limiting aspect but in a descriptive aspect. The scope of the present disclosure is not defined by the above description but by the appended claims, and all differences equivalent to the present disclosure should be interpreted to be included in the present disclosure.

| Reference Symbols | |
|---|---|
| 100: robot learning a task skill | |
| 10: training data | 20: driving unit |
| 30: learning engine | 35: task skill |

What is claimed is:

1. A modeling method for learning a task skill, which is performed by a learning engine having at least one processor, the modeling method comprising:
   receiving training data for a task to be performed by the learning engine;
   dividing, by the learning engine, the received training data into segments by using a geometric property of a predetermined probabilistic model; and
   learning, by the learning engine, a basis skill for the divided segments by modeling each divided segment;
   wherein said dividing of the received training data into segments includes:
   determining a segmentation point by analyzing geometric properties of a Gaussian mixture model (GMM) and a Gaussian mixture regression (GMR) for the received training data; and
   dividing the training data into segments based on the determined segmentation point.

2. The modeling method for learning a task skill according to claim 1, wherein said dividing of the received training data into segments calculates variance information of the received training data and determines a segmentation point, which is a criterion of segmentation, based on the calculated variance information.

3. The modeling method for learning a task skill according to claim 1, wherein said determining of a segmentation point includes:
   converting the segmentation point into a dimension, which ensures easy extraction, by reducing the number of dimensions of the training data by means of a principal component analysis (PCA);
   generating a Gaussian mixture model by using the converted training data and extracting a window, which is a region where mixture components of the generated Gaussian mixture model overlap each other in time, as a candidate region of a segmentation point; and
   selecting a point, where the covariance calculated by the Gaussian mixture regression has a minimal value in the extracted candidate region, as the segmentation point.

4. The modeling method for learning a task skill according to claim 1, wherein said learning of a basis skill is performed by generating a hidden Markov model (HMM) by using the divided segment.

5. The modeling method for learning a task skill according to claim 1, further comprising:
   receiving new training data for a task to be performed by the learning engine;
   generating, by the learning engine, a classifier having a threshold model for classifying the basis skill and the new training data into segments; and
   modeling, by the learning engine, a task skill of multi paths expanded from the basis skill by combining the learned basis skills with the new training data classified into segments by using the generated classifier.

6. The modeling method for learning a task skill according to claim 5, wherein said modeling of a task skill of multi paths generates a model of a single path or multi paths with a divergence by combining the learned basis skills with the new training data classified into segments based on a Kullback-Leibler (KL) divergence.

7. The modeling method for learning a task skill according to claim 5, wherein said modeling of a task skill of multi paths includes:
   calculating a Kullback-Leibler divergence between the model for the learned basis skill and the model for the new training data and a threshold value for the Kullback-Leibler divergence;
   comparing the Kullback-Leibler divergence with the threshold value; and
   as a result of the comparison, in a case where the Kullback-Leibler divergence is smaller than the threshold value, generating a model having a single path by incorporating the model for the new training data into the model for the basis skill, and in a case where the Kullback-Leibler divergence is equal to or greater than the threshold value, generating a model having a divergence by adding the model for the new training data to the model for the basis skill.

8. The modeling method for learning a task skill according to claim 7, wherein the threshold value is set to be a minimal value among all statuses between the model for the basis skill and the model for the new training data.

9. A modeling method for learning a task skill, which is performed by a learning engine having at least one processor, the modeling method comprising:
   receiving training data for a task to be performed by the learning engine;
   dividing, by the learning engine, the received training data into segments by using a geometric property of a predetermined probabilistic model; and
   learning, by the learning engine, a basis skill for the divided segments by modeling each divided segment;
   wherein said learning of a basis skill is performed by generating a hidden Markov model (HMM) by using the divided segment.

10. A modeling method for learning a task skill, which is performed by a learning engine having at least one processor, the modeling method comprising:
   receiving training data for a task to be performed by the learning engine;
   dividing, by the learning engine, the received training data into segments by using a geometric property of a predetermined probabilistic model;
   learning, by the learning engine, a basis skill for the divided segments by modeling each divided segment;
   receiving new training data for a task to be performed by the learning engine;
   generating, by the learning engine, a classifier having a threshold model for classifying the basis skill and the new training data into segments; and modeling, by the learning engine, a task skill of multi paths expanded from the basis skill by combining the learned basis skills with the new training data classified into segments by using the generated classifier.

11. The modeling method for learning a task skill according to claim 10, wherein said modeling of a task skill of multi paths generates a model of a single path or multi paths with a divergence by combining the learned basis skills with the new training data classified into segments based on a Kullback-Leibler (KL) divergence.

12. The modeling method for learning a task skill according to claim 10, wherein said modeling of a task skill of multi paths includes:

calculating a Kullback-Leibler divergence between the model for the learned basis skill and the model for the new training data and a threshold value for the Kullback-Leibler divergence;

comparing the Kullback-Leibler divergence with the threshold value; and as a result of the comparison, in a case where the Kullback-Leibler divergence is smaller than the threshold value, generating a model having a single path by incorporating the model for the new training data into the model for the basis skill, and in a case where the Kullback-Leibler divergence is equal to or greater than the threshold value, generating a model having a divergence by adding the model for the new training data to the model for the basis skill.

13. The modeling method for learning a task skill according to claim 12, wherein the threshold value is set to be a minimal value among all statuses between the model for the basis skill and the model for the new training data.

\* \* \* \* \*